United States Patent [19]
Van Bemmel et al.

[11] Patent Number: 6,012,017
[45] Date of Patent: Jan. 4, 2000

[54] INTERPRETING FORMATION TOPS

[75] Inventors: Peter P. Van Bemmel, Houston; Randolph E. F. Pepper, Sugar Land; Horacio R. Bouzas, Missouri City, all of Tex.

[73] Assignee: GeoQuest, a division of Schlumberger Technology Corporation, Houston, Tex.

[21] Appl. No.: 08/918,909

[22] Filed: Aug. 27, 1997

Related U.S. Application Data

[60] Provisional application No. 60/026,707, Sep. 25, 1996.

[51] Int. Cl.⁷ ........................................... G01V 1/28
[52] U.S. Cl. ........................... 702/14; 364/422; 324/325; 340/15.5; 235/181
[58] Field of Search .................... 367/30, 57, 59, 367/63, 69; 702/14; 364/422; 324/323; 340/15.5; 235/181

[56] References Cited

U.S. PATENT DOCUMENTS 3,568,143  3/1971  Naquin, Jr. .............. 340/15.5
4,320,458  3/1982  Vincent ..................... 367/25

*Primary Examiner*—Christine Oda
*Assistant Examiner*—Anthony Jolly
*Attorney, Agent, or Firm*—John H Bouchard

[57] ABSTRACT

Formation tops correlation is interpreted between sampled log curves by a weighted combination of covariance, the ratio of standard deviation, and the ratio of summed amplitude. This covariance function is computed and evaluated appropriately for the geologic environment over a sliding analysis window. Correlations are determined for any number of wells and any number of events in each well. Geologic rules are used to establish a parameter for the algorithm operation and for the analysis of the resulting function. The geologic rules include bounding guide horizons, sequence rules, and a covariance cutoff parameter. Bounding horizons are picked from pre-existing seismic or geologic interpretations and from map grids. The rule set includes onlap, truncated, conformable, and unstructured sequence definitions. Additional geologic complexity such as crossover, repeat sections, and inverted sections are accommodated by the rule set. Back-correlation for cross over sections and loop-tying for map interpretation are performed for validation.

68 Claims, 18 Drawing Sheets

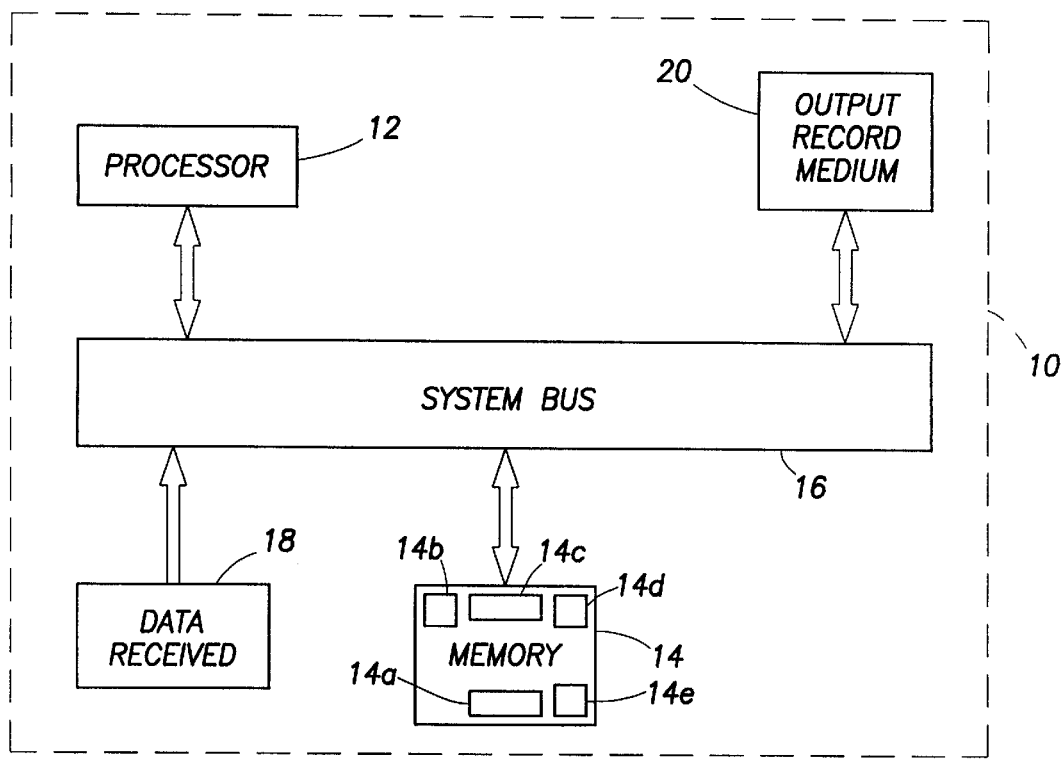
FIG.1
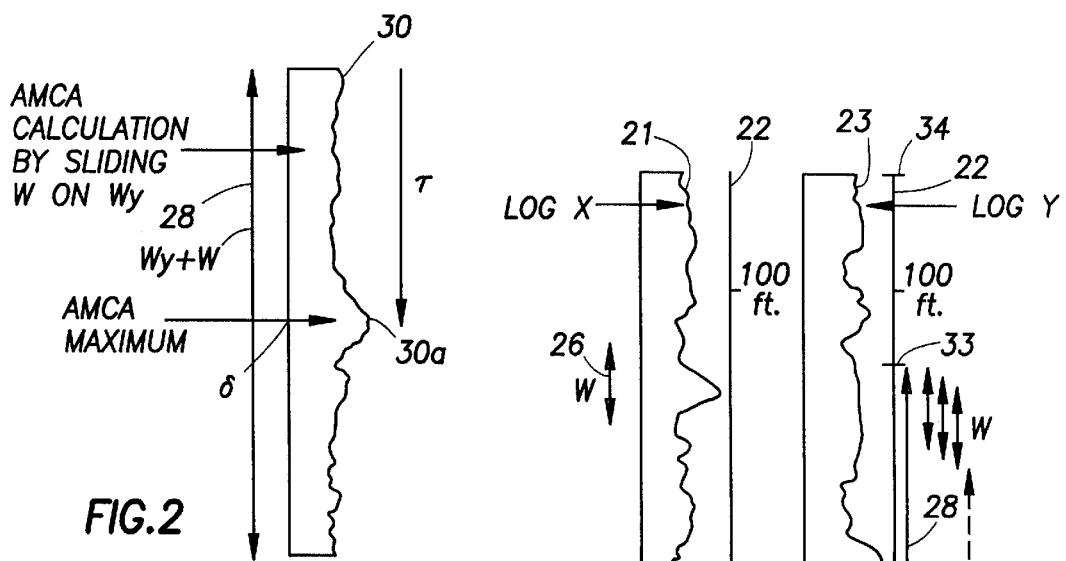
FIG.2
FIG.3

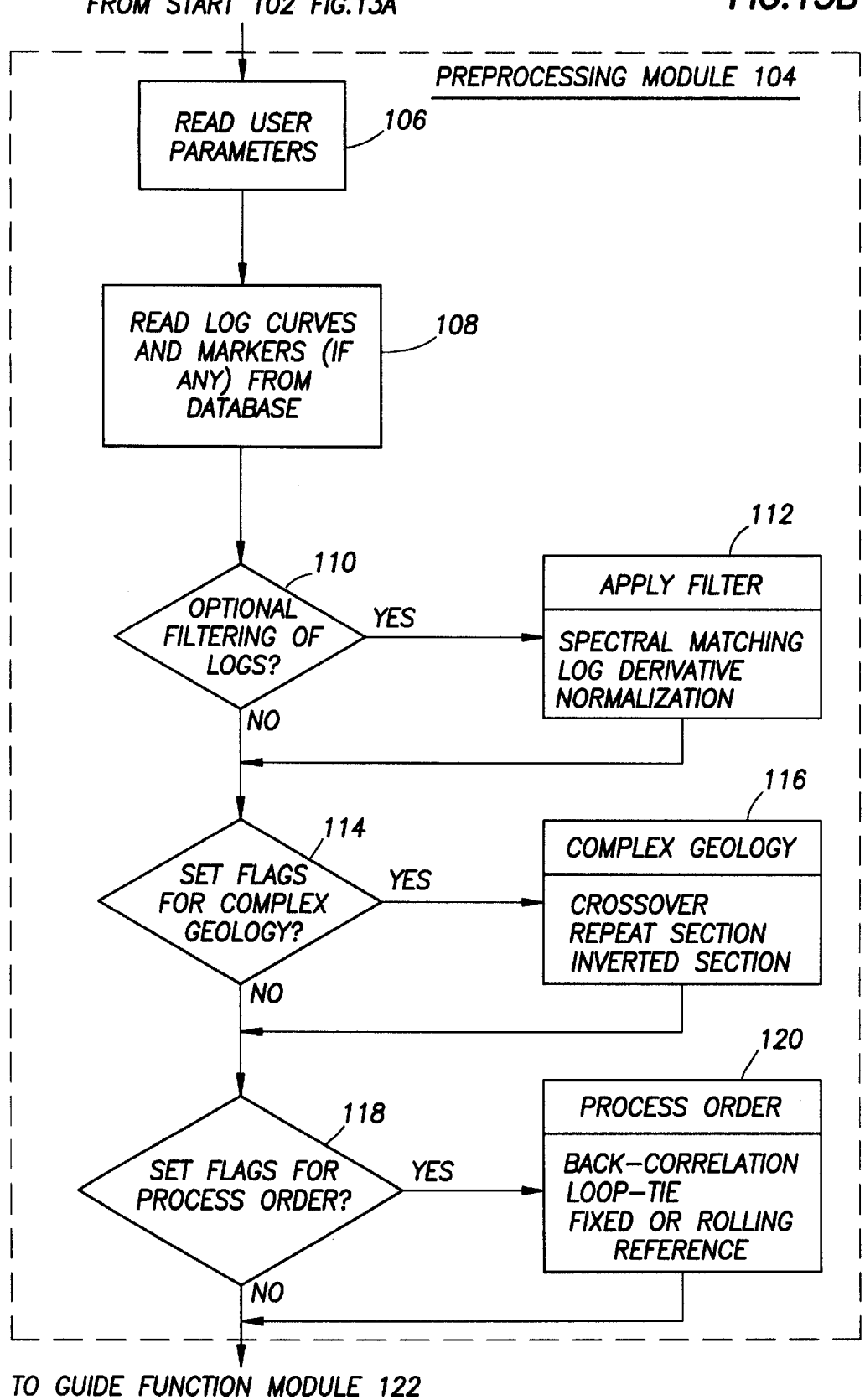

INTERPRETING FORMATION TOPS

This application claims the benefit of U.S. Provisional Application No. 60/026,707, filed Sep. 25, 1996.

BACKGROUND OF THE INVENTION

The invention relates to the interpretation of formation tops from well log curves in order to identify the same features among the wells.

Collecting well log data from boreholes drilled in the earth provides information which may be analyzed for subsurface formation or formation top (e.g., a boundary between two formations) depth structure within oil or gas fields. The information derived indicates the type of rock in the subsurface. Nuclear, gamma ray, electromagnetic, sonic, magnetic, or other source instrumentation is lowered into the boreholes to generate source signals which probe the underground formations. The formations or formation tops modify or respond to the source signals, and sensors are disposed with the source instrumentation in the boreholes to monitor the resulting or modified response signals. The response signal characteristics, for example, its amplitude, vary with the different types of source signals and will also depend on the type of formation or formation top observed. These data are collected over time and are collectively called "well log curves" or "well logs." The well logs are typically recorded as a function of depth in the boreholes, one recorded curve (or trace) for each type of source.

Multiple boreholes may be used to collect data from multiple wells. Probing multiple wells makes it possible to track spatially the various formations or formation tops under test. Wells, for example, dozens of wells, may be bored at spacings miles apart for such analysis. Thousands of wells may be bored in more detailed studies, each of which are spaced from one-quarter to one-half mile apart. Boring to a typical depth of 10,000 feet allows multiple formations to be observed in the response traces. The geoscientist's challenge is to map the location of the subsurface formations from multiple numbers of well logs. This may involve trying to match features in traces recorded from one well log to similar features in traces from other (e.g., many other) well logs, a process called correlation. The interpretation of formation tops in oil or gas fields, however, may be a difficult and time consuming activity.

SUMMARY

The invention may have the advantage of improving the accuracy of picking subtle events in the interpretation of formation tops. The invention may also have the advantage of saving a vast amount of time for geoscientists when interpreting formation tops. The invention may further have the advantage of providing enhanced confidence in the interpretation of formation tops.

In general, in one aspect, the invention features a method of interpreting reference and target well log curves recorded from different wells to help determine the approximate depth of related features at the well locations. The method may include: preprocessing the reference and target well log curves according to user input parameters; applying a guide function to the curves which limits the interpretation to portions of the curves; computing a correspondence indication between the portions; and evaluating the correspondence indication to determine if events on the portions are related.

In general, in another aspect, the invention features an apparatus for interpreting reference and target well log curves recorded from different wells to help determine the approximate depth of related features at the well locations. The apparatus may include: a memory which stores instructions for interpreting the well log data and a processor coupled to the memory which is instructed by the instructions to: preprocess the reference and target well log data according to user input parameters; apply a guide function to the preprocessed well log data which limits the interpretation to portions of the data; compute a correspondence indication between the portions; and evaluate the correspondence indication to determine if events on the portions are related.

In general, in another aspect, the invention features a system for analyzing well log curve data recorded from geographically distributed wells to determine the location of related formation tops in the wells. The system may include: input/output (I/O) devices which receive well log data recorded from wells and a processor coupled to the input/output (I/O) devices which is instructed to: preprocess the well log data according to user input parameters; determine whether a guide function is to be applied to the data; make a determination of whether events in the data are correlated, based in part on the user input parameters; and if the events are related, convert a location associated with the correlation to an approximate location of the formation tops in the wells.

In general, in another aspect, the invention features a method of evaluating the correspondence between events on a reference and a target well log curve recorded in reference and target wells to identify an approximate location of related layers in the wells. The method may include: determining whether a correspondence indicator between the events on the reference and target well log curves has a value greater than a cutoff parameter; applying a prescribed geologic guide to determine the location of an extremum of the correspondence indicator on the target well log curve; and converting the location of the extremum to an approximate absolute location within the target well.

In general, in another aspect, the invention features a computer program, residing on a computer-readable medium. The computer program may include instructions for causing a computer to: preprocess reference and target well log data according to user input parameters; apply a guide function to the well log data which directs processing of the well log data; compute a correspondence indication between portions of the well log data; and evaluate the correspondence indication to determine whether the portions are related.

Other features and advantages of the invention will be apparent from the following description, including the drawings, and from the claims.

BRIEF DESCRIPTION OF THE DRAWINGS

FIG. 1 is a block diagram of a computer system in accordance with an embodiment of the invention.

FIG. 2 shows a functional calculation result in accordance with an embodiment of the invention.

FIG. 3 shows a reference well log curve and a target well log curve in accordance with an embodiment of the invention.

FIGS. 13B–E are more detailed flowcharts of the method of FIG. 13A in accordance with an embodiment of the invention.

DESCRIPTION

Figure 4:
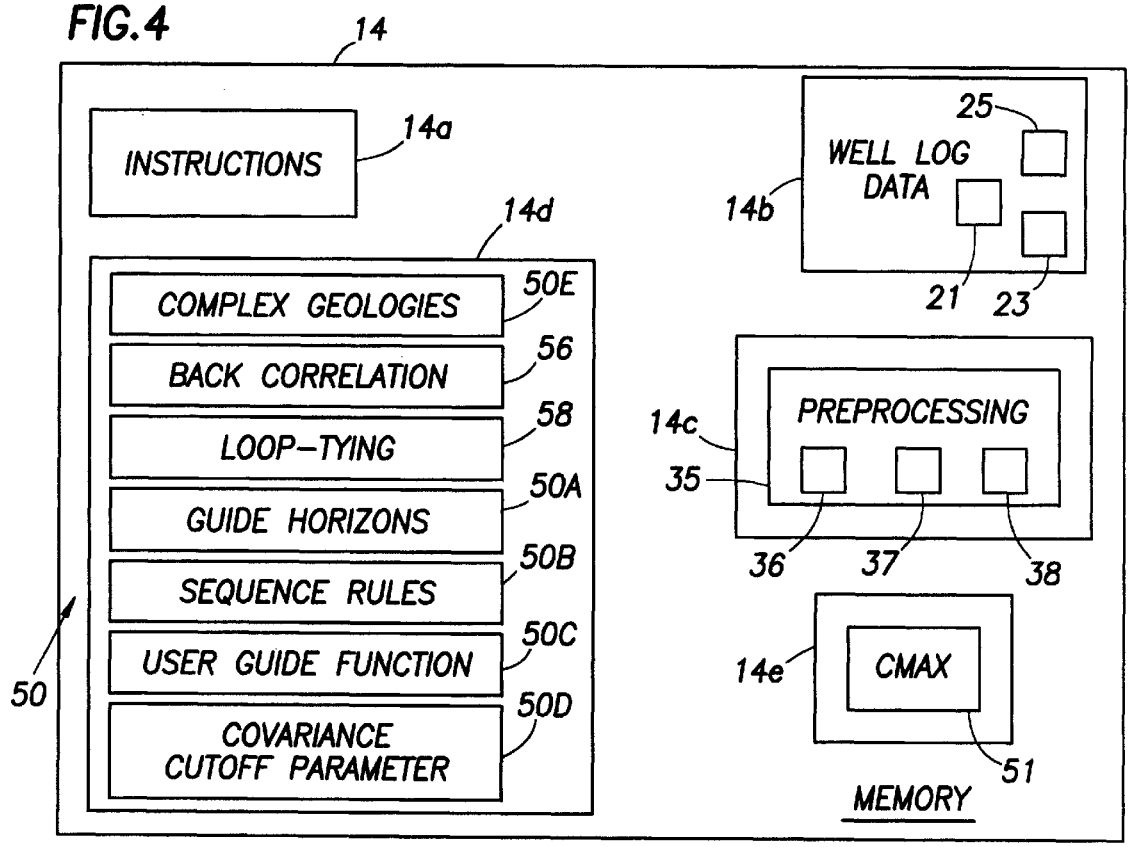
FIG. 4 shows a memory with instruction and data blocks in accordance with an embodiment of the invention.

The invention may be used to interpret correlations of geologic formation tops (which sample geologic horizons) between sampled well log curves. Referring to FIG. 1, a computer system 10 is illustrated in accordance with an embodiment of the invention. The computer system 10 may be a personal computer (PC), a workstation, a mainframe, etc. Examples of possible workstations include a Silicon Graphics Indigo 2 workstation and a Sun SPARC workstation. The computer system 10 stores and executes instructions used to interpret formation top correlations between two or more sampled well log curves.

The computer system 10 includes a programmable processor 12 and a memory 14 (e.g., a computer-readable medium) coupled to a system bus 16. The processor 12 may be, for example, a microprocessor, microcontroller, or a mainframe or work station processor. The memory 14 may be, for example, a hard disk, ROM, CD-ROM, DRAM or other RAM, flash memory, magnetic storage, optical storage, registers, or other volatile and/or non-volatile memory. An automatic marker correlation algorithm (AMCA) has instructions which may be stored in AMCA memory area or block 14a in memory 14. These instructions are used to instruct the processor 12 to determine a correlation (a type of correspondence indication or indicator) between the sampled log curves. Well log data may be received through a data received block 18 which may include, for example, I/O devices such as a user keyboard (for user input parameters), a modem, a telephone, an ISDN adapter, wireless devices or systems, or any other analog or digital communications lines or services. The well log data that is received (which may be digitized (sampled) already or analog-to-digital converted [not shown] upon being received) by the system 10 may be routed from the data received block 18, which is coupled to the system bus 16, to a well log data area 14b in the memory 14 through the system bus 16 or, alternatively, may already be stored in the well log data area 14b.

Referring to FIG. 2, the instructions stored in memory area 14a instruct the processor 12 to generate the AMCA function, Cmax($\tau$) 30, between a reference log curve and one or more target curves which may be stored in well log data area 14b. The AMCA function 30 may be stored in memory 14 in memory block 14c. The AMCA function 30 is used to match (correlate) related events recorded on the reference and target log curves for the same geologic formations or formation tops which sample geologic horizons. It quantifies how good a match is achieved and yields a numerical value that may be interpreted as a measure of confidence in the match. A "confidence" number could be assigned based on the correlation produced by the AMCA function 30.

The AMCA function 30 may be determined for any number of wells and any number of events in each well. The AMCA function 30 may be displayed on an output record medium 20 coupled to the system bus 16. The output record medium 20 may be, for example, a computer display, a chart recorder, a plotter, memory storage as described above, or any other tangible output record format.

Examples of a sampled reference log curve x 21 and a sampled target log curve y 23 for calculating the AMCA function 30, both recorded as a function of borehole depth 22 below the earth's surface, are shown in FIG. 3. A window 26 of length w and a window 28 of length Wy may be defined, respectively, on the log x 21 and log y 23 curve data. The GAMCA function 30 between the two sampled log curves 21 and 23 is calculated by sliding the window 26 incrementally (illustrated schematically in FIG. 3) over the window 28 and summing terms according to:

$$Cmax(\tau) = \alpha(C_\tau) + \beta\left(\frac{\sigma_a}{\sigma_b}\right) + \gamma\left(\frac{\sum a}{\sum b}\right)$$

for correlation position $\tau$=Wy−w/2 to Wy+w/2, where $C_\tau$ is the covariance function:

$$C_\tau = \frac{\sum_{i=-\frac{w}{2}}^{\frac{w}{2}} (x_i - \bar{x}_w)(y_{i+\tau} - \bar{y}_w)}{\sigma_{x_w} \cdot \sigma_{y_w}}.$$

In the equation for $C_\tau$ the terms $\bar{x}_w$ and $\bar{y}_w$ are the mean values, and the terms $\sigma x_w$ and $\sigma y_w$ are the standard deviations, of the data within the windows 26 and 28, of the sampled log curves x 21 and y 23, respectively, for each $\tau$. $\sigma_a/\sigma_b$ is the ratio of these standard deviations computed at each $\tau$ position, and $\Sigma a/\Sigma b$ is the ratio of the sums of the amplitudes of the reference and target log curves (e.g., log x 21 and log y 23 of FIG. 2) within the windows 26 and 28 also computed at each correlation position τ. Although not required, it is convenient to maintain 0≦Cmax≦1. To do so, for each AMCA function calculation between a reference log curve and a target log curve: (1) the "b" standard deviation term is derived from whichever one of the two curves has the larger value of standard deviation and the "a" standard deviation term is derived from the other curve. (This is done so that the standard deviation ratio is less than or equal to one and greater than or equal to zero (a similar approach is used to determine the "a" and "b" amplitude sum ratio.); and (2) the parameters α, β, and γ are adjusted such that α+β+γ=1. The AMCA function 30 is expressed as a function of correlation position τ and has a length Wy+w as shown in FIGS. 2 and 3. The lengths w and Wy (i.e., the amount of sampled data) are both selectable by user choice in running the AMCA calculation between the reference and target curves. The $x_i$ and $y_i$ terms are the sampled amplitude data from the reference and target log curves, respectively. The index i ranges from −w/2 to w/2 and is incremented in performing the summation by the sample rate of the sampled well log curves, for example, 6 inches or 1 foot. The correlation position τ has depth built in and represents a difference in depth between the reference and target log curves. Because the correlation position τ has depth built in, the approximate absolute depth from the earth's surface is known and given by τ+a known constant depth (e.g., known when the well log curves are recorded). The correlation position τ is also incremented by the sample rate.

Referring to FIG. 4, in accordance with an embodiment of the invention, geologic rules 50 may be used to establish parameters for the AMCA calculation and to analyze the resulting AMCA function 30 for a reference curve and one or more target curves. The geologic rules 50 may be stored as instructions for processor 12 in memory area 14d in the memory 14. The geologic rules 50 may include guide horizons 50A, sequence rules 50B, and a user guide function 50C whose corresponding codes may be stored in corresponding memory area 14d of memory 14, as shown in FIG. 4.

Figure 5:
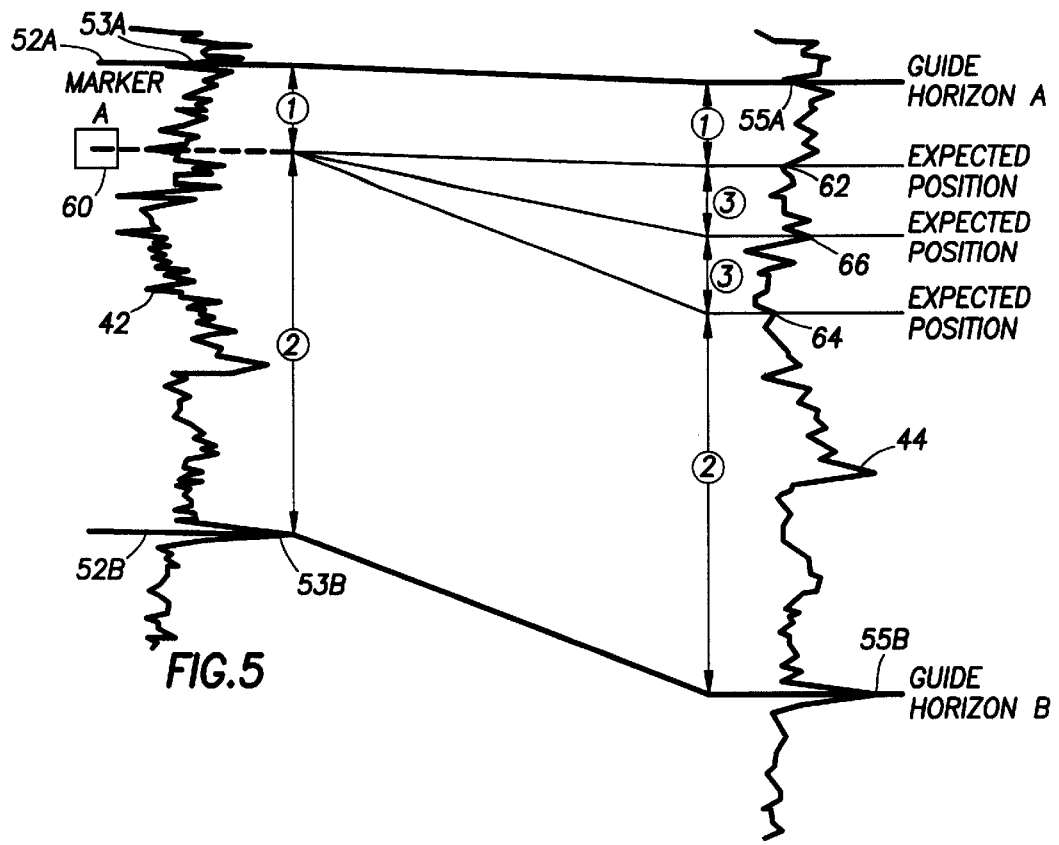
FIG. 5 shows where functional calculation maxima positions are expected on a target log curve relative to a reference log curve for different rules in accordance with an embodiment of the invention.

Referring to FIG. 5, guide horizons 50A may be defined or implemented as bounds (e.g., horizons 52A and 52B) on the sampled log curves 42 and 44 (similar to log curves 21 and 23, respectively) which may be used in generating the AMCA function 30. The horizons 50A (52A, 52B) are used to limit the extent of the sampled well log curves 42, 44 over which the AMCA function 30 is to be calculated. These bounds are known as guide horizons because they identify what the user knows or believes to be the same formation top (boundary or sampled horizon) on each of the curves. The user's knowledge or belief is based on other information known to the user about the formation or log curve data. For example, it may be known that formation top recorded signals 53A and 53B identified on reference log curve 42 are related to formation top recorded signals 55A and 55B (i.e., they are derived from the same formation tops), respectively, on target log curve 44 based on other (e.g., pre-existing seismic) regional or geologic data. Following an automatic procedure in accordance with an embodiment of the invention, the user picks (selects or marks) the sampled curves (i.e., on the reference and target log curves) to define the guide horizons (e.g., with an input device such as a mouse coupled to the output record medium 20). It is to be understood that any picking or marking as described herein may involve identifying specific memory locations or addresses in the memory 14 associated with particular data of the sampled curves. The output medium 20 may be, for example, a display which shows the log curves and the user's guide horizons picks on them. The bounding horizons 50A (52A, 52B) may also be picked from geologic interpretations that the user is aware of, and also from map grids of these interpretations. Alternatively, prior to beginning the AMCA function 30 calculation, the guide horizons may be automatically marked from data previously stored in guide horizons 50A of memory block 14b of memory 14. When no guide horizons are provided by the user or automatically marked for the AMCA calculation, the horizons are assumed to be flat. Flat guide horizons are aligned at the same depth across the reference and target log curves similar to guide horizon 52A shown in FIG. 5.

Figure 6:
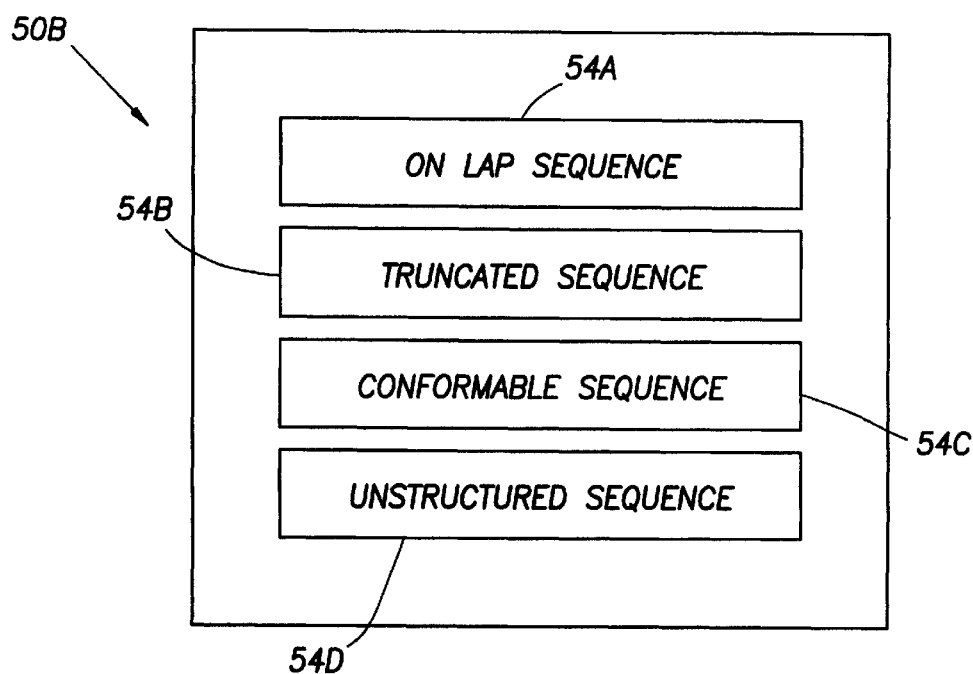
FIG. 6 shows a rules portion of FIG. 4 in more detail in accordance with an embodiment of the invention.

Referring to FIG. 6, the sequence rules 50B of the geologic rules 50 that may be used to aid in the AMCA function 30 calculation include, for example, onlap sequence 54A, truncated sequence 54B, conformable sequence 54C, and unstructured sequence 54D definitions. The corresponding code for these sequence rules may be stored in the sequence rules 50B area of memory block 14d of memory 14, as shown in FIG. 4. The sequence rules 50B aid in limiting the overall extent on the target log curve over which the AMCA function 30 is calculated when looking for a match to a user-selected event on the reference log curve (e.g., on curve 42). The sequence rules 50B may be chosen by the user. When applied, they provide an indication of the expected position, on the target log curve (e.g., on curve 44), of the location of the correlation extremum or maximum (e.g., the maximum of the AMCA function 30 similar to maximum 30A of FIG. 3). With the sequence rules 50B, the defined window 28 on the target log curve is started (i.e., the starting position (edge) of window 28 is determined) relative to the guide horizons, with the length Wy of the window defined by the user, and does not extend past the bounds of the guide horizons 50A (52A, 52B).

The user may choose the sequence rule 50B for each well log interval bounded by two guide horizons 50A (52A, 52B) across the log curves 42 and 44 shown in FIG. 5. The choice may be made from the following:

1. Onlap sequence 54A—the correlation maximum position of the AMCA function 30 on the target log curve is expected to be parallel to, and below, the top bounding horizon (e.g., horizon 52A) at the same depth position (e.g., position 62 in FIG. 5) as the user-selected marker (e.g., marker A 60 in FIG. 5) across the curves 42 and 44 (Picks or markers may be shown in the drawings on the well log curves or displaced from the curves, as in the case of marker 60. In either case, it is to be understood that each marker marks a specific location on the curve corresponding to a curve data address location in memory 14b, where, for example, the dashed line crosses the reference curve, as in FIG. 5, or at the same depth position as the marker even though a dashed line may not be illustrated.);

2. Truncated sequence 54B—the correlation maximum position of the AMCA function 30 on the target log curve is expected to be parallel to, and above, the bottom bounding horizon (e.g., horizon 52B) at the same relative depth position (e.g., position 64) to the bottom bounding horizon as the user-selected marker (e.g., 60) across the curves 42 and 44;

3. Conformable sequence 54C (discussed in more detail below)—the correlation maximum position of the AMCA function 30 on the target log curve is expected to be shifted to a position (e.g., position 66) that is proportional to the thickness change of the layer (thickness change of the formation as recorded by events on the log curves) in going from the reference to the target log curves for each evaluation point on the target log curve (i.e., each layer being evaluated for correlation may have a different thickness on the target log curve than its thickness on the reference log curve); and 4. Unstructured sequence 54D—the correlation maximum position of the AMCA function 30 on the target log curve is expected to be anywhere in the defined interval Wy on the target log curve (see, e.g., FIG. 3).

Figure 7:
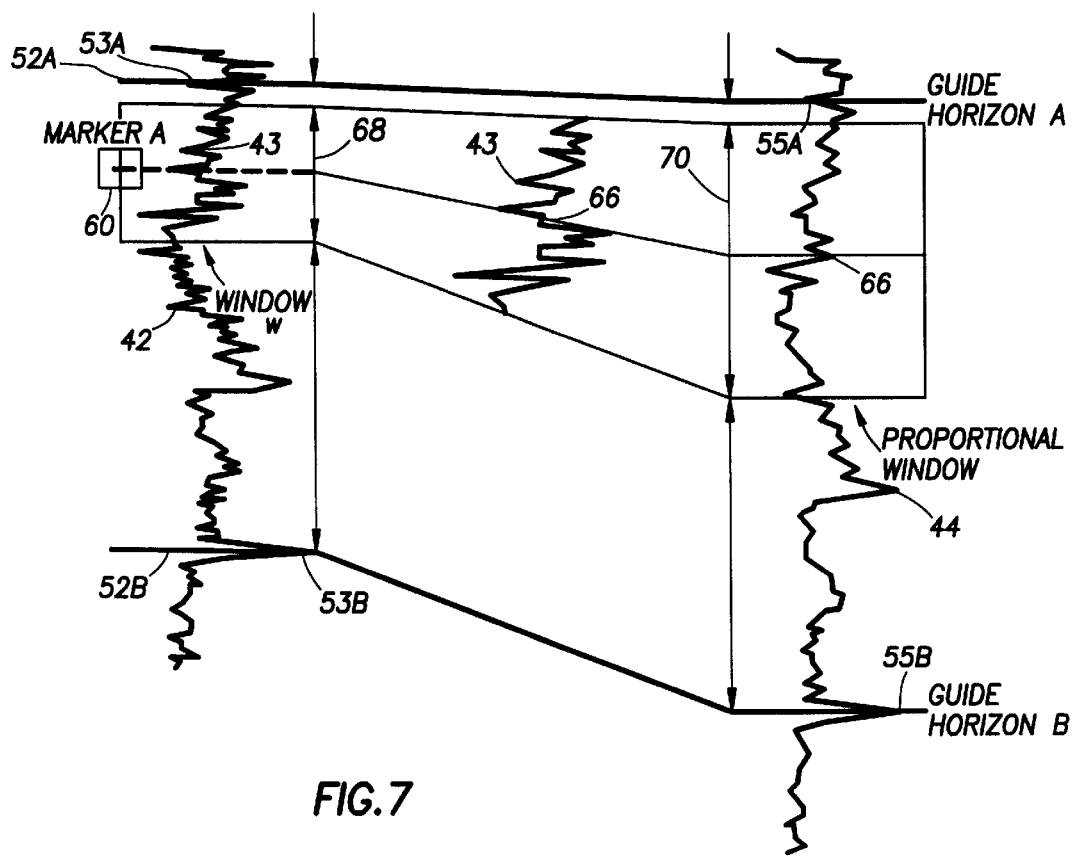
FIG. 7 shows the application of one of the rules in accordance with embodiment of the invention.

FIG. 7 provides more-detail for the conformable sequence 54C. For each user-selected marker A 60 within window 68 (similar to window 26), the AMCA function 30 may be computed with the window 68 of length w of the reference log curve x 42 first stretched (or compressed) proportionally (e.g., using a sinx/x interpolation function) to match the thickness (thinness) of a corresponding interval 70 on the evaluation target well log curve y 44. FIG. 7 schematically shows a section (i.e., an interval) 43 in the window 68 of reference curve 42. The section 43 is to be evaluated by calculation of the AMCA function 30 and is shown in the process of being stretched proportionally from its size (w) within window 68 on curve 42 to match the corresponding proportional size interval of window 70 on the curve 44. The stretching (or compression) is done prior to calculation of the AMCA function 30.

Referring again to FIG. 4, an additional rule or procedure 50 in accordance with an embodiment of the invention may be implemented as a user guide function (also referred to as a semi-automatic method) 50C whose code may be stored in memory block 14d of memory 14. The user guide function 50C may be effective, for example, in the workstation environment, when: (1) the log curves (e.g., 42, 44) are compressed for display purposes (e.g., to display a reference log curve and a number of target log curves); and (2) an interpreter (user) can make visual correlations between wells easily, but cannot mark the depth accurately (e.g., on depth scale 22 of FIG. 3) on the target log curve at screen display scale. In such situations, instructions are provided in memory block 14d which instruct the processor 12 to allow the AMCA function 30 to be guided instead by the user's "crude" pick on the target log curve to find an accurate depth for a (correlation) maximum (e.g., 30A of FIG. 2) of the AMCA function 30. The user guide function 50C may allow rapid formation tops picking while allowing the interpreter a regional (large scale) display of the data. For example, the user must first pick and mark an event on a displayed (e.g., displayed on output record medium 20) reference log curve with the desired degree of accuracy, but may not be able to do so easily on the target log curve when the target log curve is displayed at a small size (e.g., when displayed in a compressed or unzoomed view). Using the user guide function 50C, the user only has to pick (e.g., with a mouse or a keyboard connected to system 10) an approximate location on the target log curve for evaluation with the AMCA function 30 calculation. With the user guide function 50C, the correlation maximum is expected to be near the approximate point selected by the user on the target curves. Then system 10 will find the correlation (AMCA function 30) maximum which exceeds the user-defined AMCA cutoff (discussed below) that is nearest to the user pick for the accurate depth.

Figure 8:
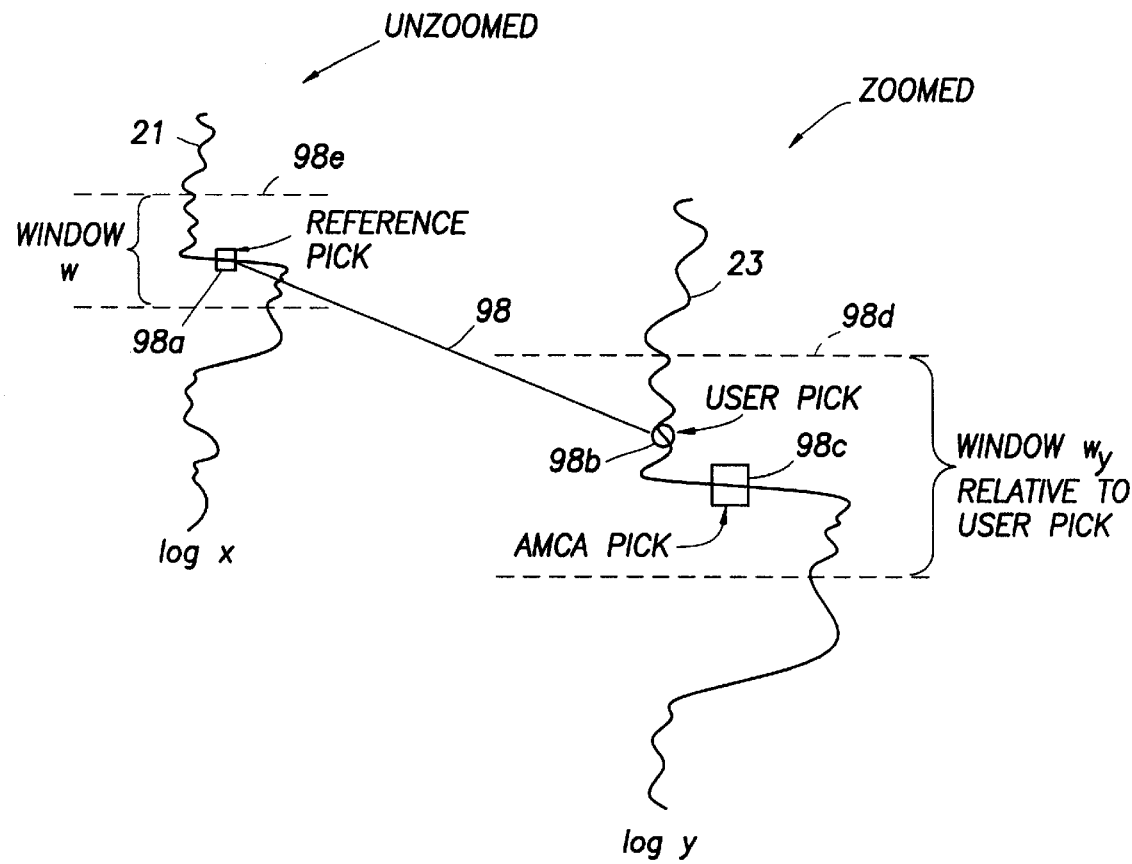
FIG. 8 shows how picks made by a user were refined to a more accurate location in accordance with an embodiment of the invention.
Figure 18:
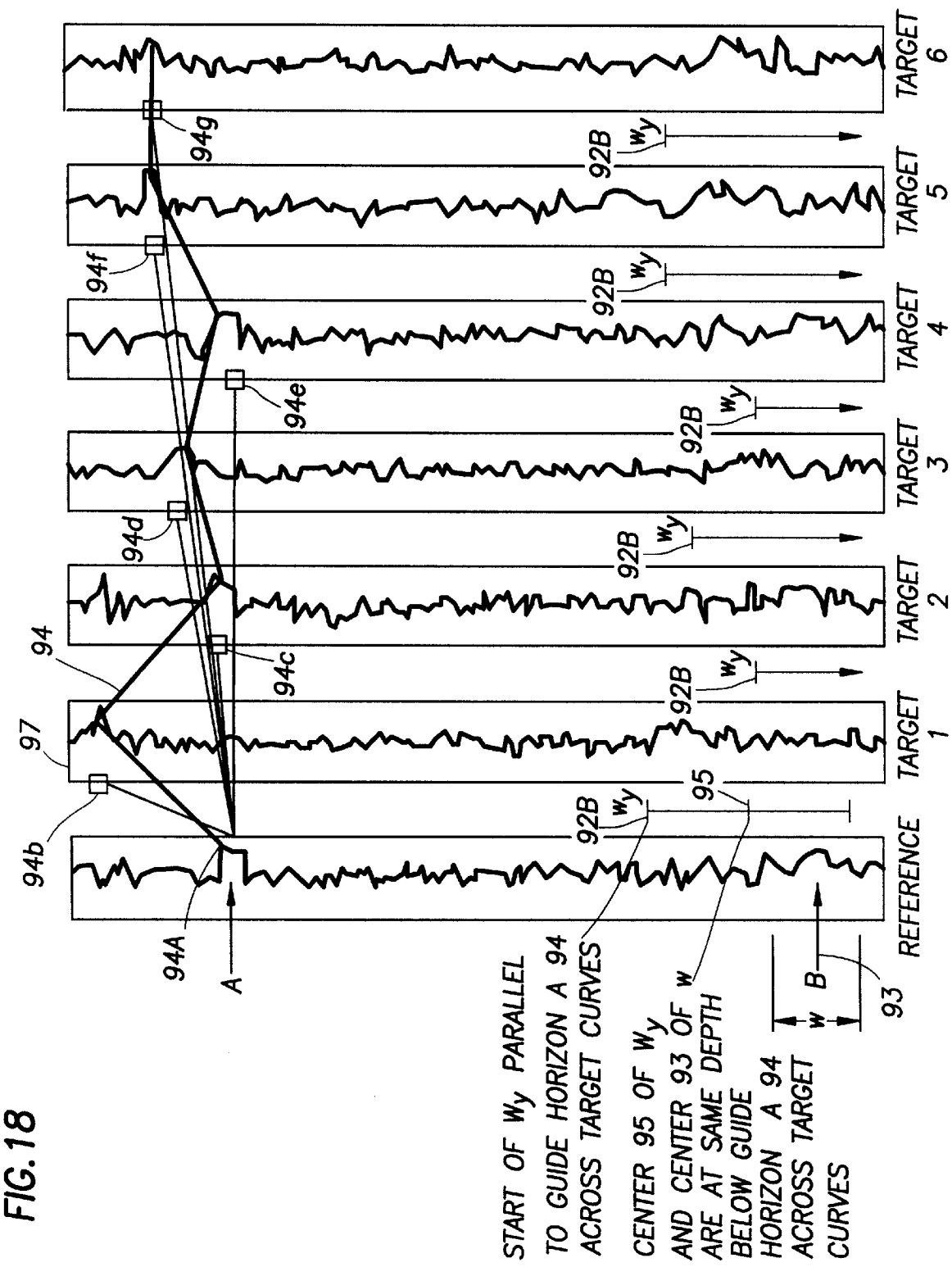
FIG. 18 shows how a method is applied in accordance with an embodiment of the invention.

The semi-automatic method allows the user to pick many boreholes and many events at a reduced scale (i.e., unzoomed), with low definition, with all boreholes and events presented in the screen at the same time. This may save a great amount of time in repositioning, zooming, unzooming and scrolling of the data. A compacted pseudo-cross section display (e.g., on output record medium 20 which may be a computer display) may be used to pick on a group of target borehole curves, typically up to 40 on one screen. FIG. 18 (discussed below) shows an example of an event (indicative of a formation top) picked on the reference log using the semi-automatic correlation method. After the event 94a is picked, the corresponding events 94b–g in the target curves are found and marked (after the user makes his or her crude picks on the target log curves). FIG. 18 shows that even when using a very small scale, it may be possible to pick accurate depths based on the reference event picked. In FIG. 8, the line 98 represents how the driving picks (e.g., reference pick 98a on the reference log curve 21 and user pick 98b on the target log curve 23) made by the user were refined for the accurate location of the markers 98c on the target log curves. The target curve 23 in FIG. 8 appears zoomed or blownup for purposes of illustrating the semi-automatic method. A user may choose, however, to display the curve 23 on the computer display either zoomed (as in FIG. 8) with few other curves displayed or unzoomed with many other curves displayed, as suits his or her purpose.

Figure 9:
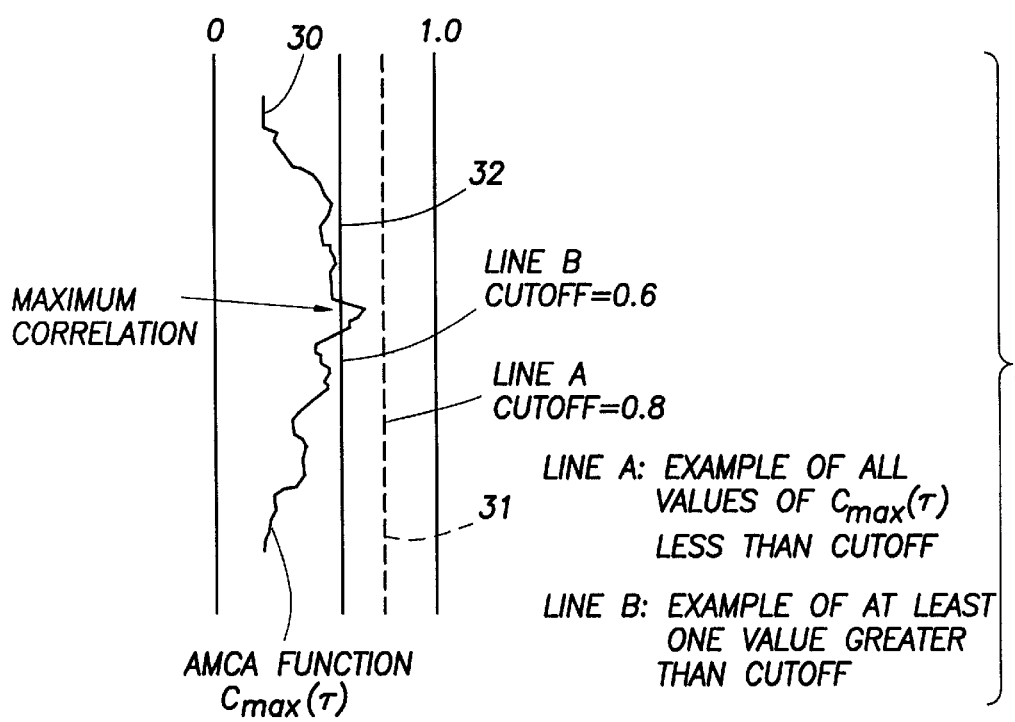
FIG. 9 shows an example of how a user parameter may be applied in accordance with an embodiment of the invention.

Referring again to FIG. 4, the geologic rules 50 are shown also including an AMCA cutoff parameter 50D, whose code is stored in memory block 14d of memory 14. The cutoff 50D is a user-selectable acceptance criterion that a valid match has been found between the reference and target log curves (e.g., 42 and 44). In other words, it is a value of the AMCA function 30 at or above which the user is willing to accept that a valid correlation has been found. The cutoff parameter 50D (value) is expressed as a percentage value, with an identical match represented as 100% (i.e., an identical match has a value of 1 for the correlation maximum). When performing the AMCA calculation, it may be desirable to set a high value of the cutoff parameter 50D (e.g., 0.7–0.8) in order to provide enhanced confidence that matches have been found (between events on the log curves) for related formation tops. An example of how cutoff 50D may be applied is shown in FIG. 9. The cutoff 50D value set by the user may have to be adjusted, depending on the quality of the log curve data. For example, the initial value 31 (line A from FIG. 9) may be set high (e.g., to 0.8) for data from target wells closer to the reference well, and then lowered to a value 32 (line B from FIG. 9) for target log curves from target wells located further away from the reference well. This may be necessary or advantageous to accommodate, for example, any changes that may occur in the same formation at distances away from the reference well. Some example changes that may occur will be discussed below. For the target wells which are further away, the AMCA function 30 may appear as in FIG. 9 relative to the cutoff values 31 and 32.

Referring again to FIG. 4, complex geologies 50E, such as crossover, repeat sections, and inverted sections may be accommodated or handled by the rule set 50 for calculation of the AMCA function 30. If the user expects that complex geologies need to be considered, he or she may set appropriate flags. Complex geologies 50E may be stored in memory block 14d of memory 14.

Crossover occurs when sequential formation layers reverse their sequence order over a region. Without crossover, in calculating the AMCA function 30, it is assumed that the strata (formations) between guide horizon (depths) are deposited in the same sequence at both the reference and target well locations. Hence, crossover is not allowed. If two successive correlation maximums in the AMCA function do crossover (meaning two successive layers have crossed over), however, the one with the highest correlation maximum value of Cmax(τ) is selected as the correct event. The other correlation maximum is flagged with a question mark ("?") to signify to the user of a possible conflict or "mis-pick" (explained below) in the interpolation.

Repeat sections are simply where successive formation layers repeat in depth. Repeat section may occur in areas of reverse faulting. If repeat sections are expected, they may be handled in the form of marker-defined surfaces (or horizons) multiply defined in depth. For this case, the AMCA function 30 calculation will pick multiple correlation maximums for the number of repeat sections expected.

Inverted or overturned sections (i.e., section depth structure is physically inverted) may occur in areas of recumbent folds. If inverted sections are expected, they may be handled by allowing reversed correlations between limited regions of the reference and target log curves. With reversed correlations, the approximate section of one of the sets of the reference or target log data is reversed (inverted) and the other is not reversed before the AMCA function 30 calculation is performed.

Figure 10:
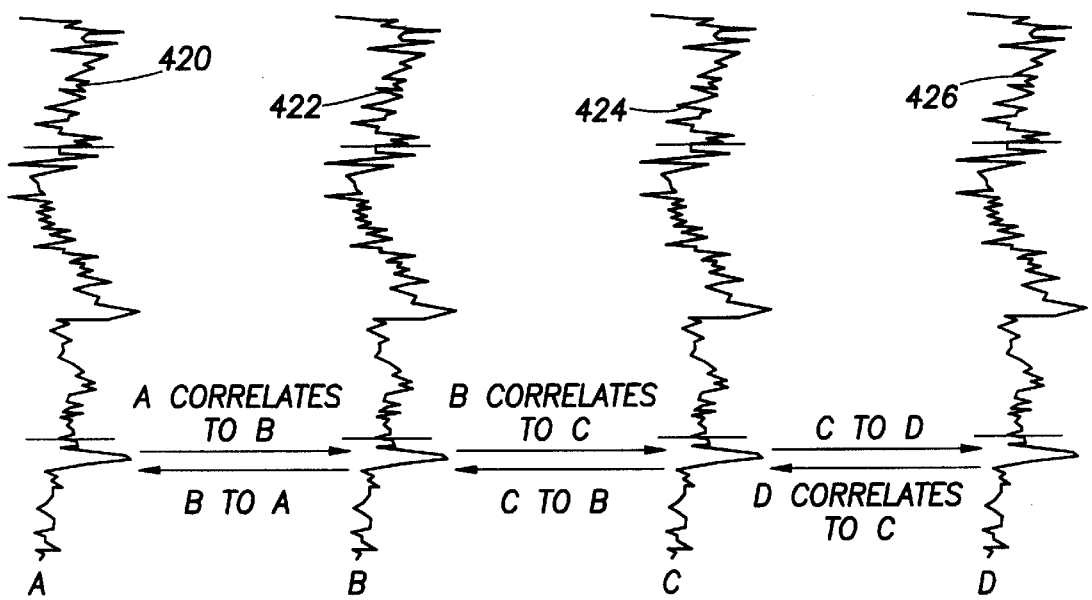
FIG. 10 shows the application of a procedure to a set of well log curves in accordance with an embodiment of the invention.
Figure 11:
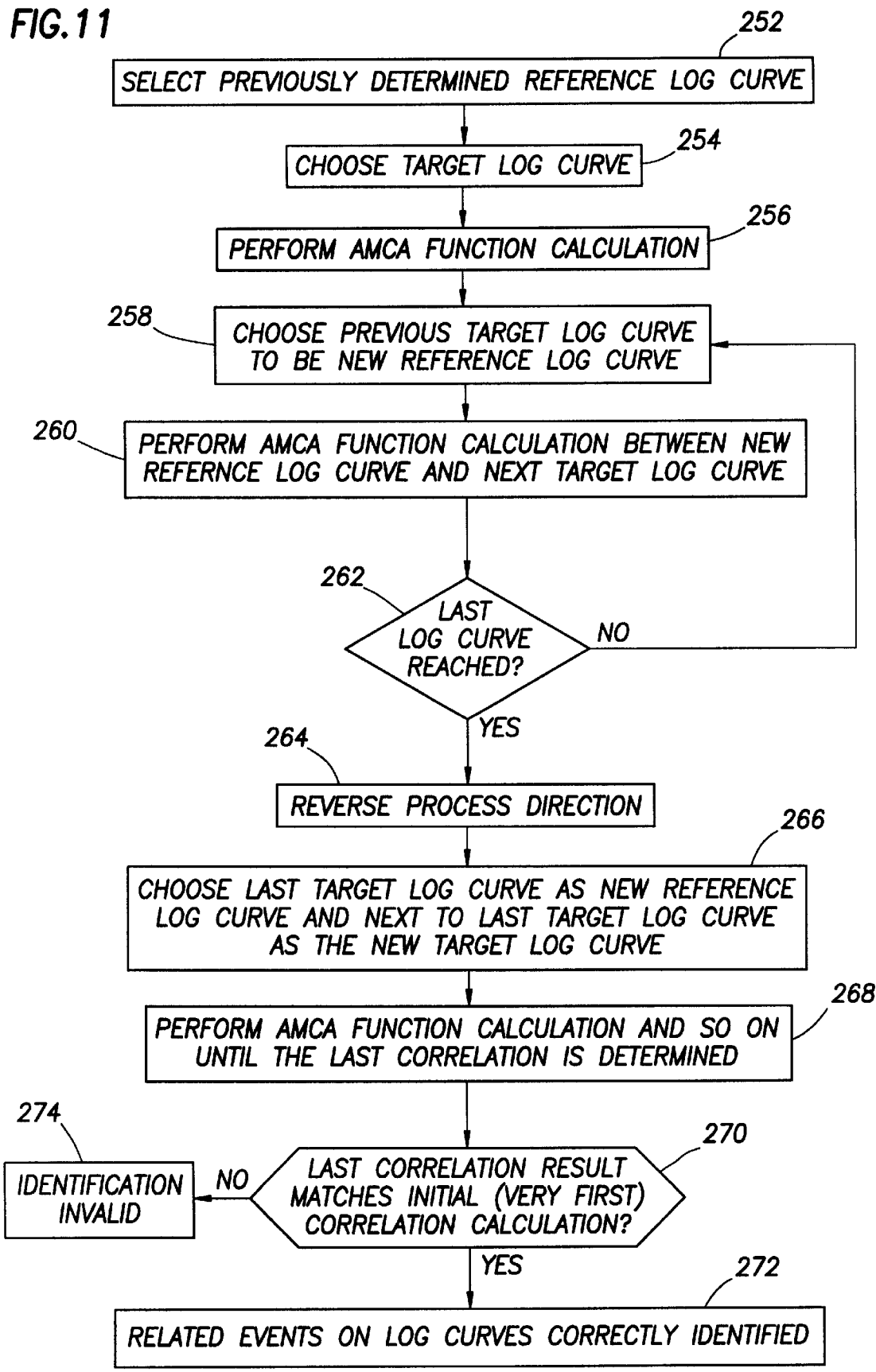
FIG. 11 is a flowchart of the procedure of FIG. 10 in accordance with an embodiment of the invention.

For consistency checking, back-correlation ("back" AMCA function 30 calculations) 56 (for cross-sections of formation strata) and loop-tying (AMCA function 30 loop-tying calculations) 58 (for map interpretation of regional formation strata), whose codes are stored in memory block 14d of memory 14 (FIG. 4), may be performed for validation. For example, a back-correlation calculation may be performed and inform the user of inconsistent formation tops picks. Reference is made to FIG. 10 which schematically illustrates how back-correlation is performed and to FIG. 11 which is a flowchart of a method in accordance with an embodiment of the invention for performing back-correlation. A previously determined reference well log curve 420 (e.g., a portion of a well log curve like curve 21 of FIG. 3 believed by the user to be a good well log curve) is selected 252 as the initial reference log curve. The other well log curves 422, 424, and 426 are taken from wells drilled along a linear direction (or any direction in the case of loop-tying, as described below) from the well from which curve 420 was derived. The target log curve is chosen 254 to be log curve 422 and an AMCA function 30 calculation (correlation) is performed 256 between curves 420 and 422. Then curve 422 is chosen 258 to be the new reference log curve and a new correlation calculation is performed 260 between curve 422 and curve 424. The process is repeated until the last log curve 426 is reached 262. The process then reverses direction 264, the curve 426 is chosen 266 as the new initial reference log curve, and the curve 424 is chosen as the new initial target log curve. The correlation (AMCA function 30 calculation) between curves 426 and 424 is determined 268, and so on, until the last correlation (AMCA function 30 calculation) is determined between curves 422 and 420. If the last correlation result matches 270 the initial (very first) correlation calculation result, then all the correlation results are assumed to be valid, meaning that the related events on the log curves have been correctly identified 272. Otherwise, the identification is invalid 274.

Figure 12:
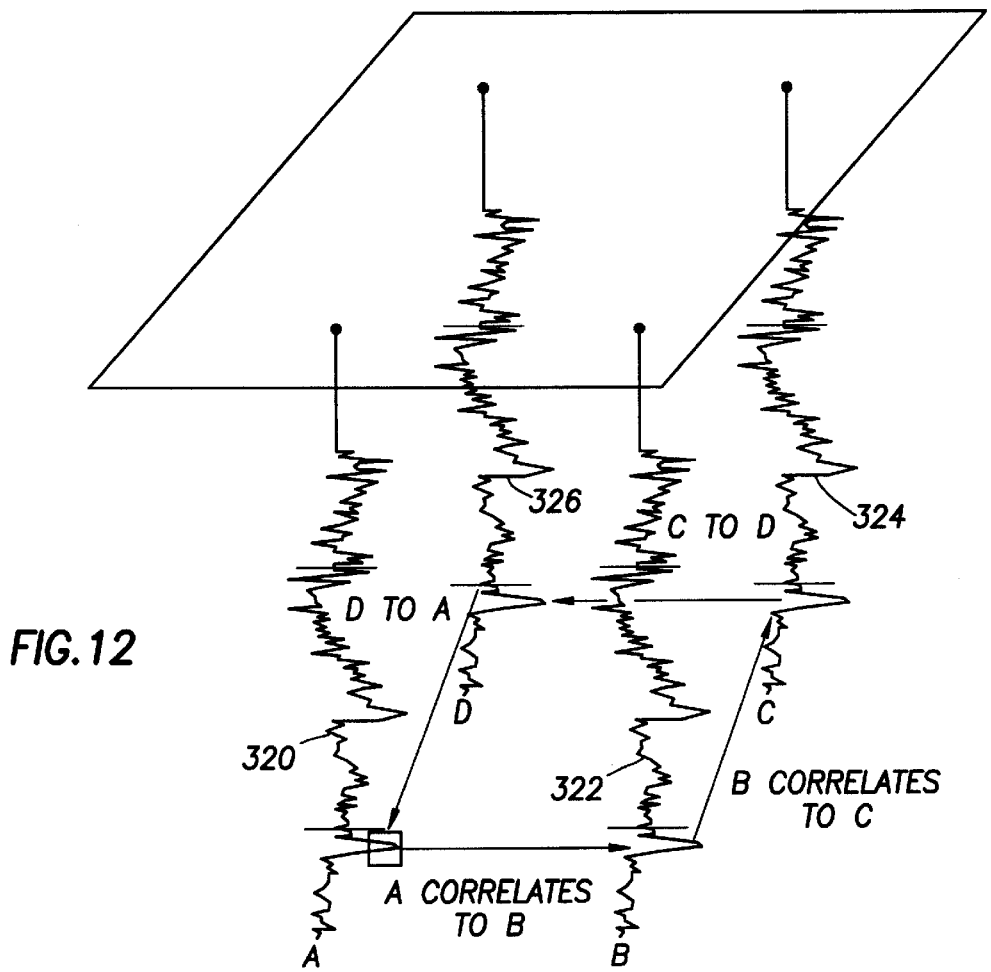
FIG. 12 shows the application of another procedure to a set of well log curves in accordance with an embodiment of the invention.

A similar correlation validation process could be described for loop-tying which is schematically illustrated in FIG. 12 starting with portion of log curve 320 and proceeding through portions of log curves 322, 324, and 326, and then back to portion 320. With loop-tying, the log curves are derived from wells which are spatially distributed (i.e., the wells are not limited to be drilled linearly displaced from each other along the same direction) in two or three dimensions.

A more detailed functional description of the operation of system 10 under control of processor 12 and instructions stored in memory 14 is set forth below. Referring to FIGS. 13A–E, an automatic method and the semi-automatic method in accordance with embodiments of the invention are shown as flowcharts of software modules. Beginning at start block 102 of FIG. 13A, data of a reference log curve (e.g., 21 in FIG. 3) and a target log curve (e.g., 23 in FIG. 3) are pre-processed 104. Instructions 35 for pre-processing 104 may be stored in memory block 14c of memory 14 and performed in order to enhance the prospect of determining a good correlation between events on the reference and target log curves. Preprocessing 104 may include window tapering, spectral matching, and a derivative method whose instructions are stored in blocks 36, 37 and 38, respectively, of instructions 35 in memory block 14c of memory 14. Instructions 36 for window tapering may involve "central weighting", for example, applying a well known triangular weight function to the data on both the reference and target logs, as will be discussed further below. Central weighting is used to make the well log data between the reference and target logs be biased preferentially towards the center of the respective windows (e.g., windows 26 and 28) prior to calculating the AMCA function 30. For example, with triangular weighting, for each window 26 or 28 of the reference or target log curve, respectively, starting at the center amplitude data value (not shown), each amplitude data value is multiplied by a number that biases all values towards the window center. In particular, the center value of the window 26 (or 28) may be multiplied by 1 and the values at the edges of the window 26 (or 28) may be multiplied by 0, with other values between the center and edges being multiplied by values in proportion to the slope of the ramp portions of the triangular weighting function (not shown). The wider the window 26 or 28 (i.e., the larger the value of w or Wy), the greater the slope of the (ramp portions of the) triangular weighting function, and vice versa.

Instructions 37 for spectral matching involves transforming the reference and target log data into the frequency domain for filtering (e.g., frequency limiting filtering). Filtering is a procedure to remove noise from the data to enhance the probability of determining a good correlation. Instructions 38 for the derivative method involves performing the AMCA function 30 computation with derivatives (i.e., after differentiation) of the reference and target log data instead of with the log data itself. This procedure may help in determining good correlations when strong amplitude peaks (relative to the background) or block averaged logs are involved. Block averaging is a process of smoothing, where well log curve data are preaveraged in blocks before being sampled.

Referring to FIG. 13B, more details of the preprocessing 104 are shown. In preprocessing 104, the user parameters are read 106. Examples of user parameters include values of α, β, and γ set by the user, values of the cutoff parameter 50D from 0.0 to 1.0, and whether the user wishes to set flags for complex geology and for process order. After the user parameters are read, the log curves and markers (if any) from the database (e.g., guide horizon markers which are stored in memory block 14b) are read 108. It is then determined whether filtering of the logs will occur 110, for example, by querying the user. If yes, an appropriate filter is applied 112, such as for spectral matching (a procedure for filtering a log curve so that its frequency components match those of another log curve), log curve derivative, or normalization (a procedure for normalizing the reference and target log curves to a center value on the respective curves).

If not, or if the filter has been applied, it is determined if the user parameters indicate that flags should be set for complex geology 114. If yes, appropriate complex geology flags are set 116 for crossovers, repeat sections, and/or inverted sections. If the user did not want to set flags for complex geology or if they have been set, it is determined if the user parameters indicate that flags should be set for process order 118. If yes, appropriate flags are set for process order 120. Process order may be set among, but not limited to, back-correlation, loop-tying, and fixed or rolling reference (described below). If process order flags are not set or after they are set, the process continues to guide function processing 122 (see FIGS. 13A and 13C).

In guide function processing 122, the geologic rule (e.g., from geologic rules 50) is obtained for the marker (if any) 124. The target window is then calculated 126 (e.g., the size Wy and position of the target window 28 on the target log curve is determined) which may be based on the geologic rule, if any. This may involve determining if the user wishes to run the automatic option 128. If the user wants the automatic option, the window (Wy) start position relative to the guide horizon (function) and sequence rule is determined 130. If, on the other hand, the user wishes to run the semi-automatic option 132, the window (Wy) start position relative to a user pick on the target curve is determined 134. If the conformable sequence rule is to be applied 136, the proportional stretch or squeeze (compression) of the reference log curve is performed 138. If the conformable sequence rule is not applied, or after it is applied, it is determined if an inverted section is expected 140. If so, the reference log curve (or appropriate section of the reference log curve) is inverted 142. If an inverted curve or section is not expected, or after the reference log curve or section is inverted, the process proceeds to AMCA processing 144 (see FIGS. 13A and 13D).

In AMCA processing 144, to calculate the AMCA function 30, a loop index is set 146 for the correlation position $\tau$ (i.e., the loop index is set to correspond to positions on the target log curve from Wy(start)−w/2 to Wy(end)+w/2). If the automatic option was chosen 148, the window (Wy) start position (see e.g., positions 92B in FIG. 18) is set 150 relative to the guide function (e.g., A in FIG. 18) and sequence rule. If, on the other hand, the semi-automatic option was chosen 152, the window (Wy) start (e.g., window (Wy) start 98d on target curve 23 in FIG. 8) relative to the user pick (e.g., user pick 98b in FIG. 8) on the target log curve (e.g., target curve 23 in FIG. 8) is set 154. (Window (w) start 98e is the window start on the reference curve 21 in FIG. 8.) Central weighting, for example, triangle weighting (described above), is then performed 156 to the w and Wy windows at the current lag ($\tau$). The Cmax($\tau$) (AMCA function 30) is then computed 158 for the current alignment ($\tau$) by: (1) computing 160 the covariance $C_\tau$; (2) computing 162 the standard deviations $\sigma_w$ (i.e., $\sigma x_w$) and $\sigma_{wy}$ (i.e., $\sigma y_w$); (3) computing 164 the amplitude sums in the windows ($\Sigma w$ and $\Sigma w_y$); and (4) determining 166 Cmax($\tau$)(see equation above), where $\sigma_b$ ($\sigma_a$) is the greater of (lesser of) $\Sigma_w$ and $\Sigma_{wy}$ as discussed above. If the last $\tau$ has not been reached 168 yet in the process, the process loops back to step 156 until Cmax($\tau$) has been determined for all $\tau$. Then, the AMCA function 30 (Cmax($\tau$)) is stored 170 in the Cmax($\tau$) 30 area 51 of memory area 14e of memory 14 and the process proceeds to evaluation processing 172 (see FIGS. 13A and 13E).

Figure 13A:
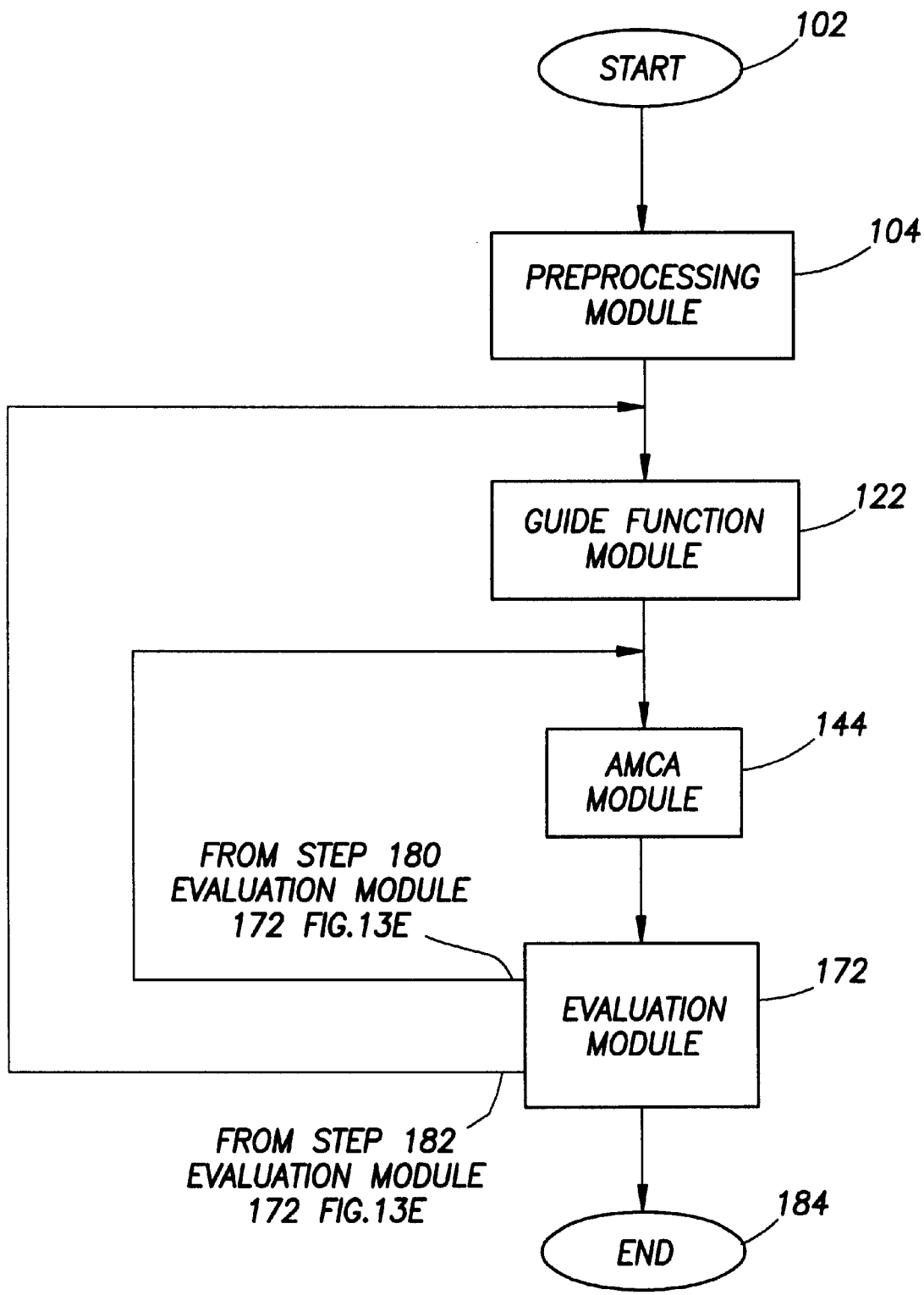
FIG. 13A is a flow chart of a method in accordance with an embodiment of the invention.
Figure 13C:
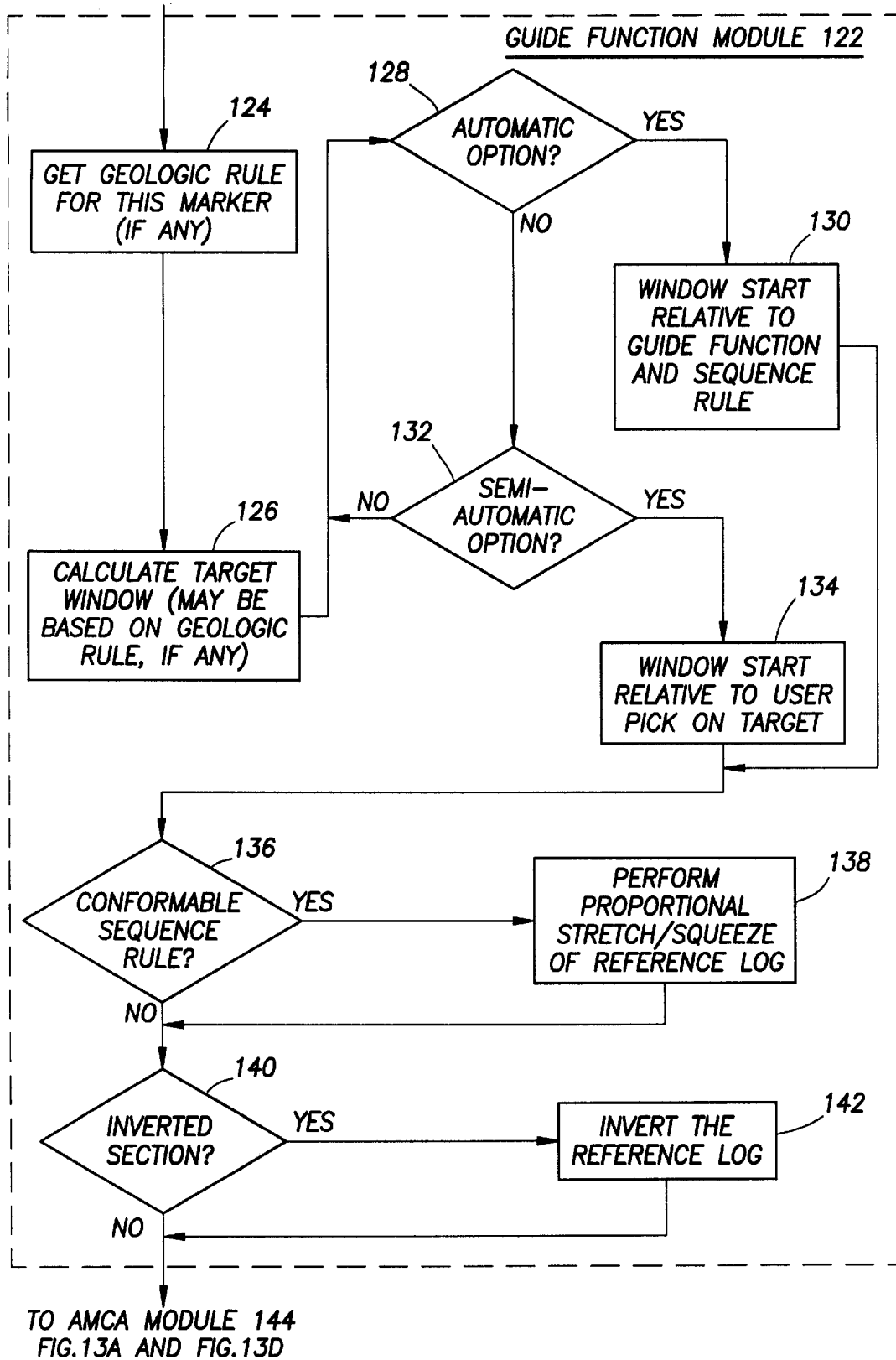
Figure 13D:
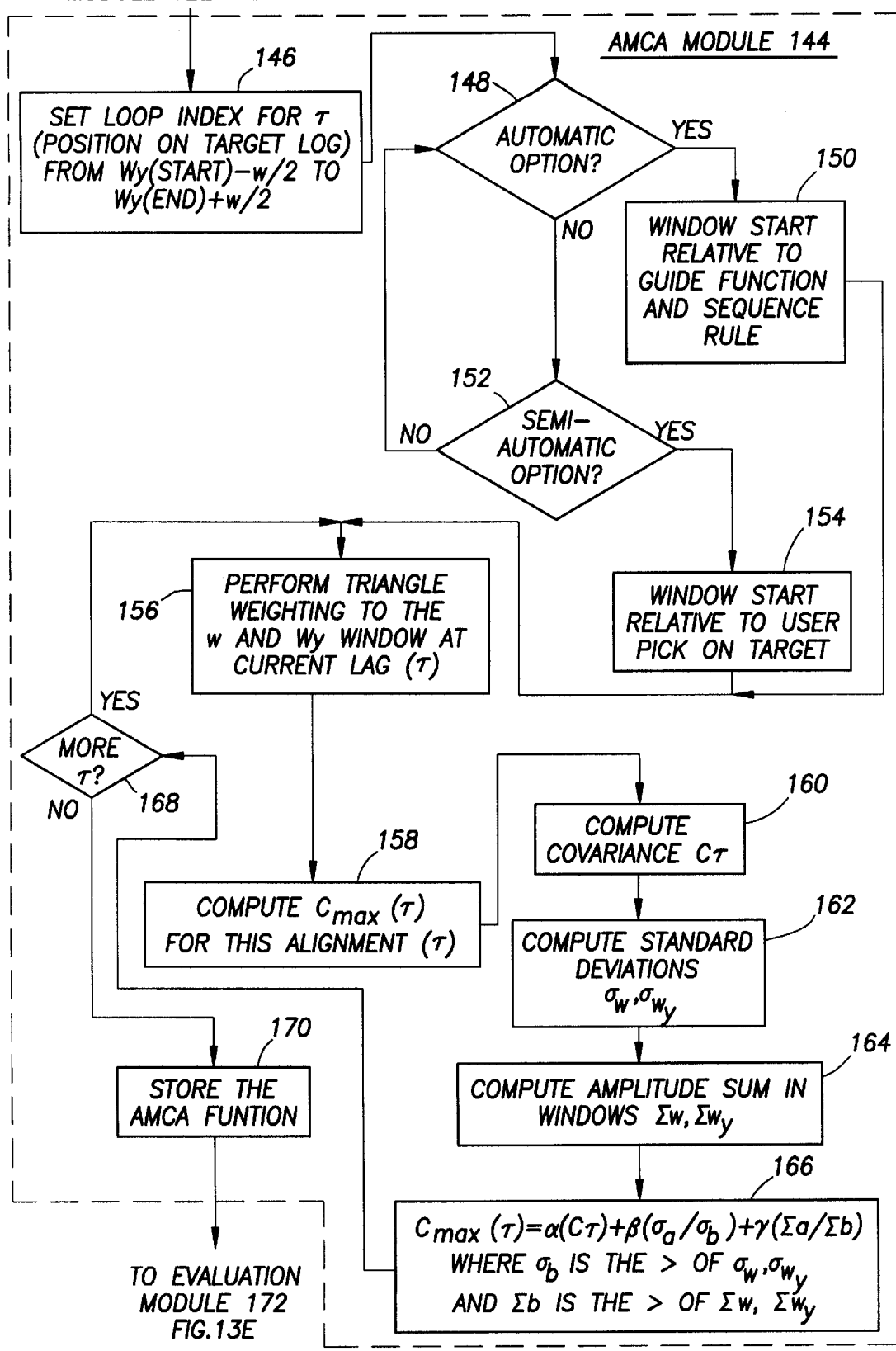
Figure 13E:
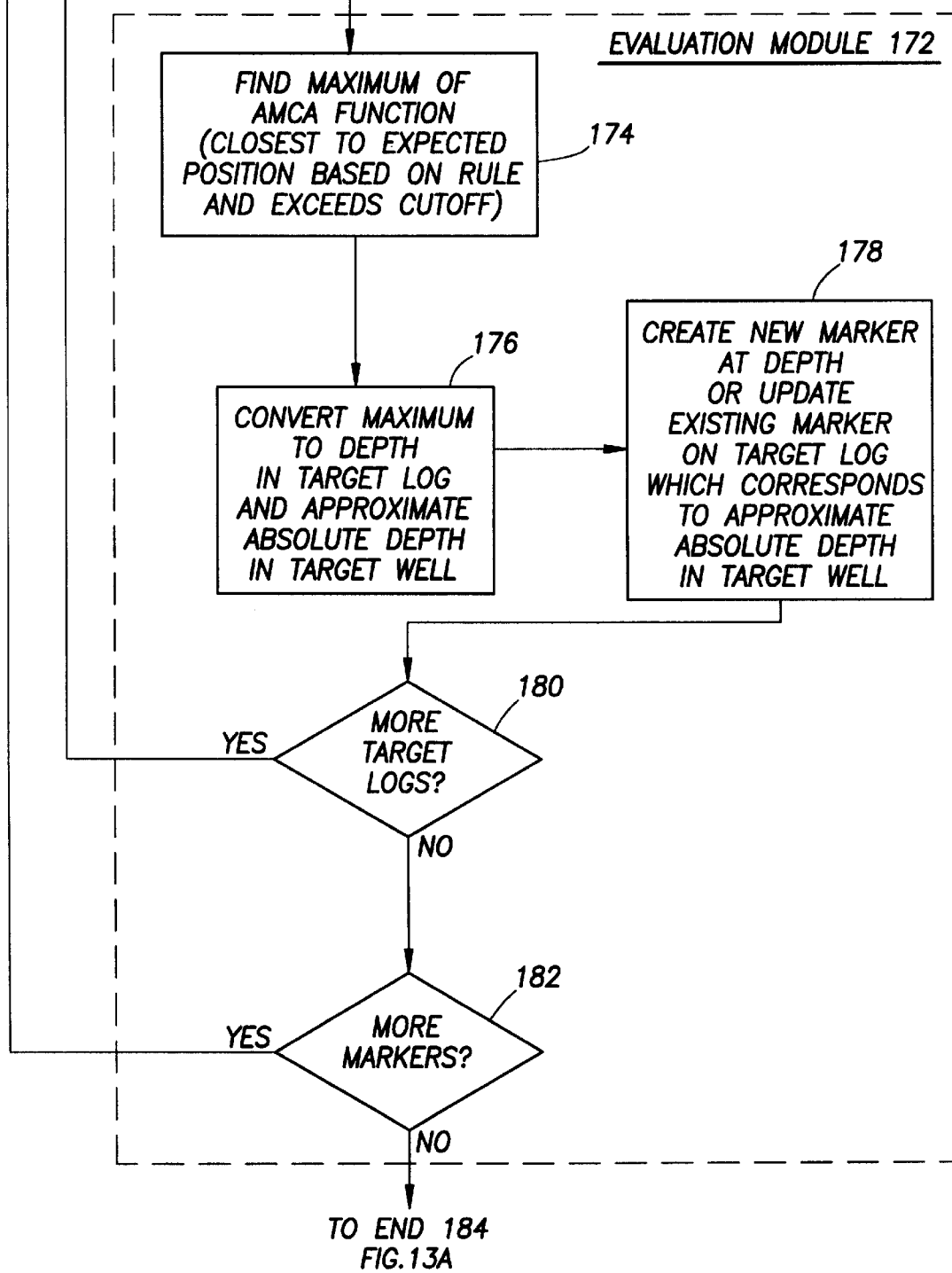

In evaluation processing 172, the maximum of the AMCA function 30 is found 174 which honors the geologic rules and the cutoff parameter. The maximum that is found may be, for example, the closest maximum (not shown) of the AMCA function 30 which corresponds to a position (e.g., AMCA pick 98c on the target log curve 23 in FIG. 8 in the semi-automatic method) relative to the expected position (see FIGS. 5 and 7) or the user's pick (e.g., user pick 98b in FIG. 8 in the semi-automatic method), based on the particular geologic rule being applied. The maximum is also one that exceeds the cutoff parameter (value). The position of the maximum (i.e., $\tau$ position), for example, the $\tau$ value $\delta$ of 30A in FIG. 2, is then converted 176 to an approximate absolute depth on the target log curve and, therefore, to the approximate absolute depth in the drilled target well in which the target data curve is recorded. The conversion may be done by taking the approximate known depth of the upper edge 33 (see FIG. 3) of, for example, window 28 (i.e., the start Wy position) of the target log and adding to it the depth value of the position of the AMCA function 30 maximum (e.g., 30A at $\delta$ as shown in FIG. 2) which is known relative to the upper edge 34 (FIG. 3). A new marker is then created (or an existing marker is updated) 178 on the target log (e.g., stored as a marker location 25 in block 14b of the memory 14 for marking the target well log curve) at that approximate absolute depth, which corresponds to the approximate absolute depth in the target well for the target data marked. If there are more target logs to be processed, 180, the process then proceeds back to step 146 in the AMCA processing 144 (FIGS. 13A and 13D) for the next target log curve and user pick (if the semi-automatic method is being run). If, however, there are no more target logs, it is determined if more markers are needed of if the user wants more markers 182. If yes, the process proceeds back to step 124 in the guide function processing 122 (FIGS. 13A and 13C). If there are to be no more markers, however, the process proceeds to end 184 (FIG. 13A). From the above procedures (automatic or semi-automatic options), the AMCA function 30 may be obtained along with its maximum (e.g., 30A in FIG. 2) for a reference log curve and one or more target log curves, and thereby identify related (formation top) features between the curves.

In accordance with an embodiment of the invention, the reference and target log curves with the identified related feature (i.e., recorded signals are identified from the same formation top) may be displayed on the output record medium 20 (e.g., a computer monitor) to a user. Such a display may be similar in appearance to FIG. 18 with the formation top (event) marker locations 94a–g (similar to markers 80A–F) identifying the related feature among the curves. The user may find the characteristics of such a display useful in identifying the location (i.e., the marker locations may be converted to approximate absolute depths in the wells) of potential sources of hydrocarbons (e.g., oil) in a horizon (e.g., at particular formation tops) and/or at fault locations. The horizon and/or faults are the ones probed in wells drilled to collect the reference and target log curve data to begin with. The user may be able to use the displayed information to identify locations for drilling additional wells to formation tops at particular approximate absolute depths relative to the earth's surface where hydrocarbon is likely to be found for recovery.

In accordance with alternative embodiments of the invention, the semi-automatic method may be used together with the automatic method to give flexibility to the user for diverse geologic settings. For example, if the shallowest markers are picked using the semi-automatic method, then the next (in depth) markers may be constrained by a non-crossing rule and the reference log window will not extend (cross) past the markers above.

Figure 14:
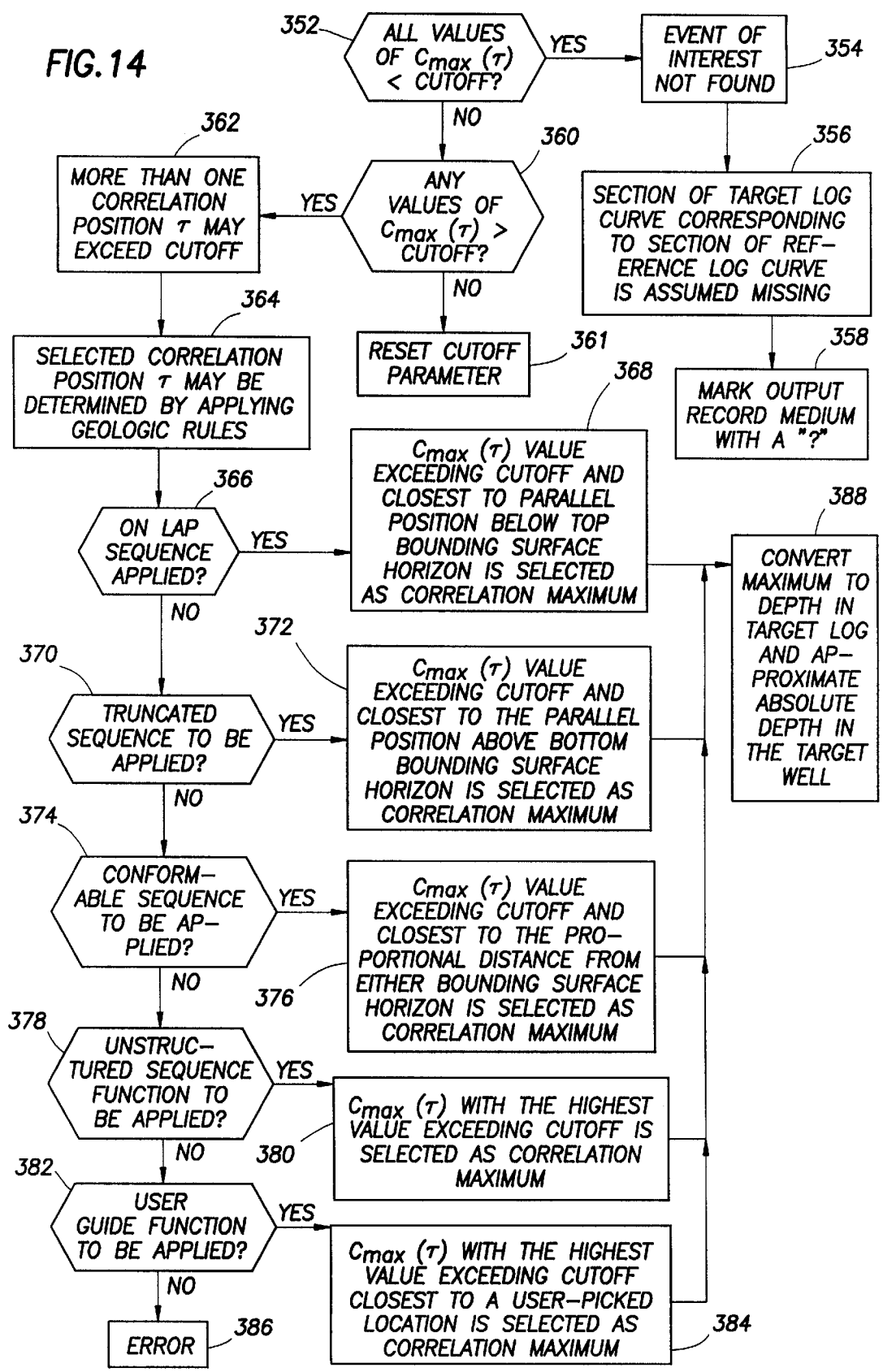
FIG. 14 is a flowchart of another method in accordance with an embodiment of the invention.

Referring to FIG. 14, a method in accordance with an embodiment of the invention is shown. This method may be used in evaluating the AMCA function 30 after it has been calculated (a post-processing operation). The AMCA function 30 may be evaluated with this method between two guide horizons 50A (e.g., 52A and 52B of FIG. 5) as follows: (1) if all values of Cmax($\tau$) 30 are 352 less than cutoff 50D, the event of interest is not found 354, (2) a section of the target well log curve (e.g., of curve 23 in FIG. 3) corresponding to a section of a reference well log curve (e.g., of curve 21 in FIG. 3) is assumed 356 to be missing and the output record medium 20 (e.g., a display) is marked 358 (e.g., with a question mark ["?"]); (3) on the other hand, if any values of Cmax($\tau$) 30 are 360 greater than cutoff 50D, more than one correlation position $\tau$ may exceed 362 the cutoff 50D, and (4) the selected correlation position $\tau$ may be determined 364 by applying (determined by the user) the geologic rules 50 as follows (otherwise the user is instructed to reset the cutoff parameter 361): (5) if onlap sequence 54A is to be applied 366, the Cmax($\tau$) 30 value exceeding cutoff 50D and closest to the parallel position below the top bounding surface horizon 52A is selected 368 as the correlation maximum (e.g., 30A of FIG. 2); (6) if truncated sequence 54B is to be applied 370, the Cmax($\tau$) 30 value exceeding cutoff 50D and closest to the parallel position above the bottom bounding surface horizon 52B is selected 372 as the correlation maximum; (7) if conformable sequence 54C is to be applied 374, the Cmax($\tau$) 30 value exceeding cutoff 50D and closest to the proportional distance from either bounding surface horizon 52A or 52B is selected 376 as the correlation maximum; (8) if unstructured sequence function 54D is to be applied 378, the Cmax($\tau$) 30 with the highest value exceeding the cutoff 50D is selected 380 as the correlation maximum; and (9) if user guide function 50C is to be applied 382, the Cmax($\tau$) 30 with the highest value exceeding the cutoff 50D closest to a user-picked location is selected 384 as the maximum of the AMCA function 30. Regardless of which one of the above sequence rules 50B or the user guide function 50C is applied, once the correlation maximum is found, the correlation maximum position ($\tau$) is converted 388 to the approximate absolute depth in the target log curve which is the approximate absolute depth in the target well from which the target data are collected, as described above. The depth information may be used to improve prospecting for hydrocarbon in the target well and its vicinity in the field. If none of the sequence rules 50B is applied, and if the user guide function 50C is not applied, then an error has occurred 386 which may be indicated to the user.

Figure 15:
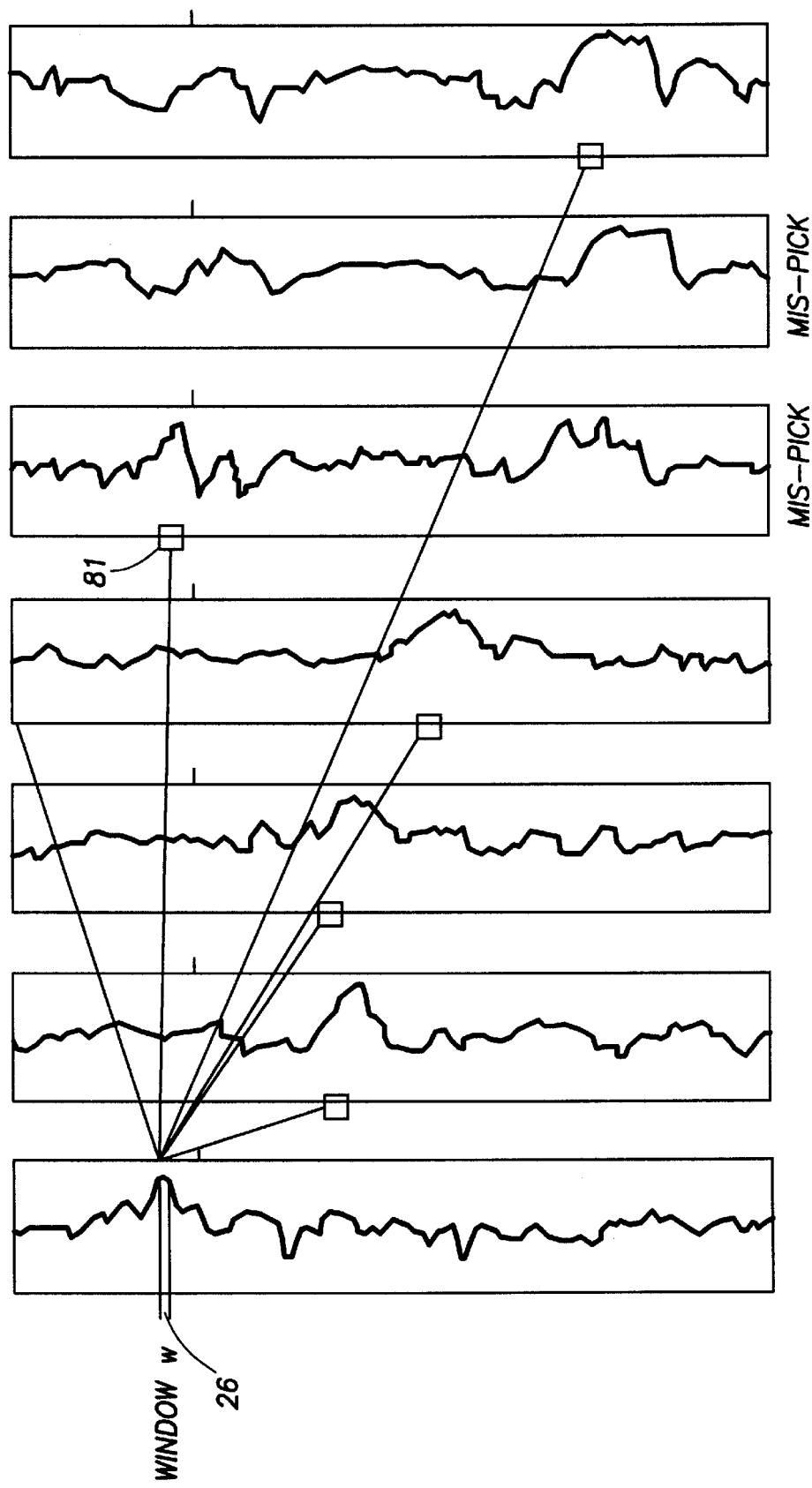
FIG. 15 shows the effects of a reference log curve parameter size being too small in accordance with an embodiment of the invention.
Figure 16:
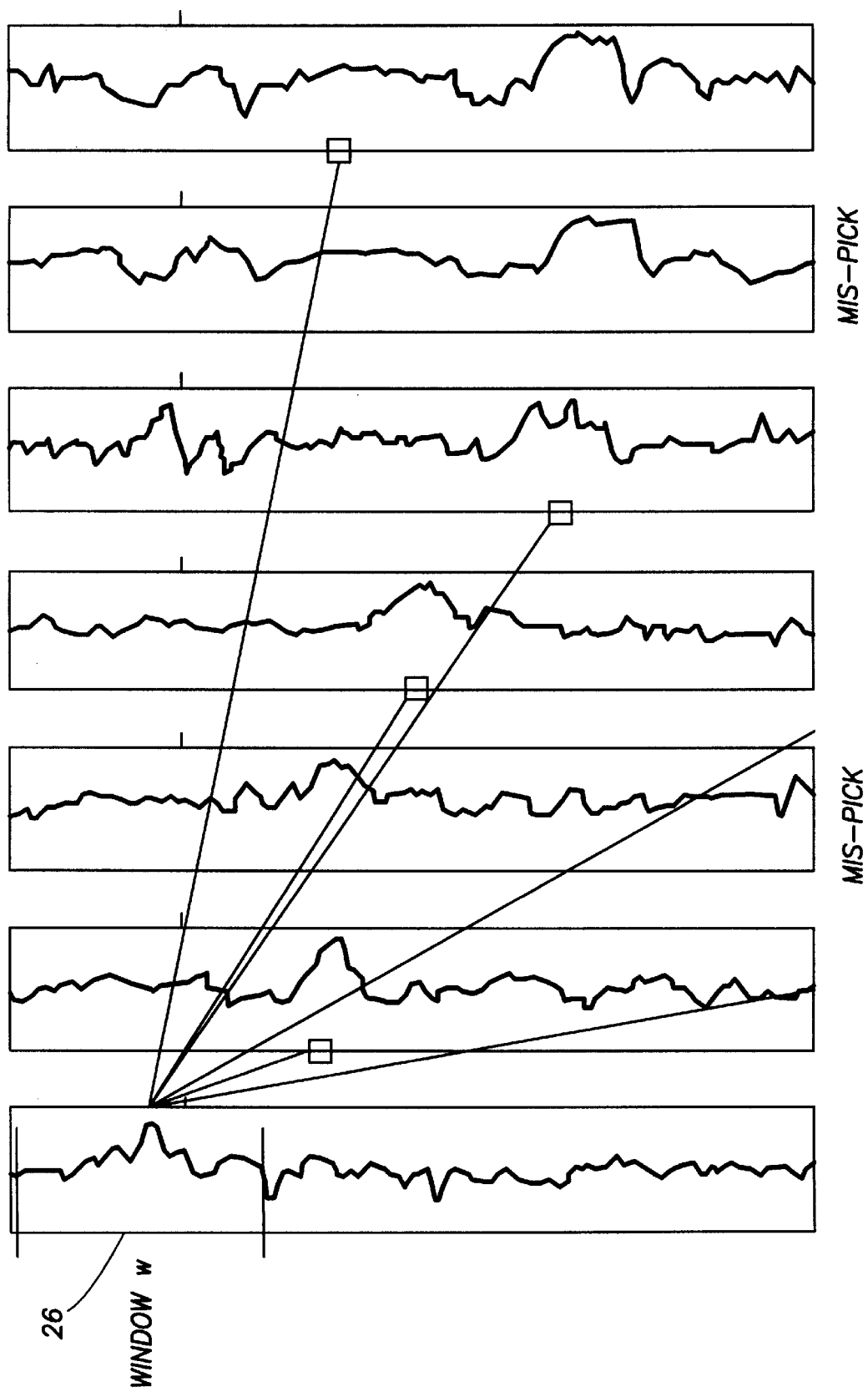
FIG. 16 shows the effects of the reference log curve parameter size of FIG. 15 being too large in accordance with an embodiment of the invention.
Figure 17:
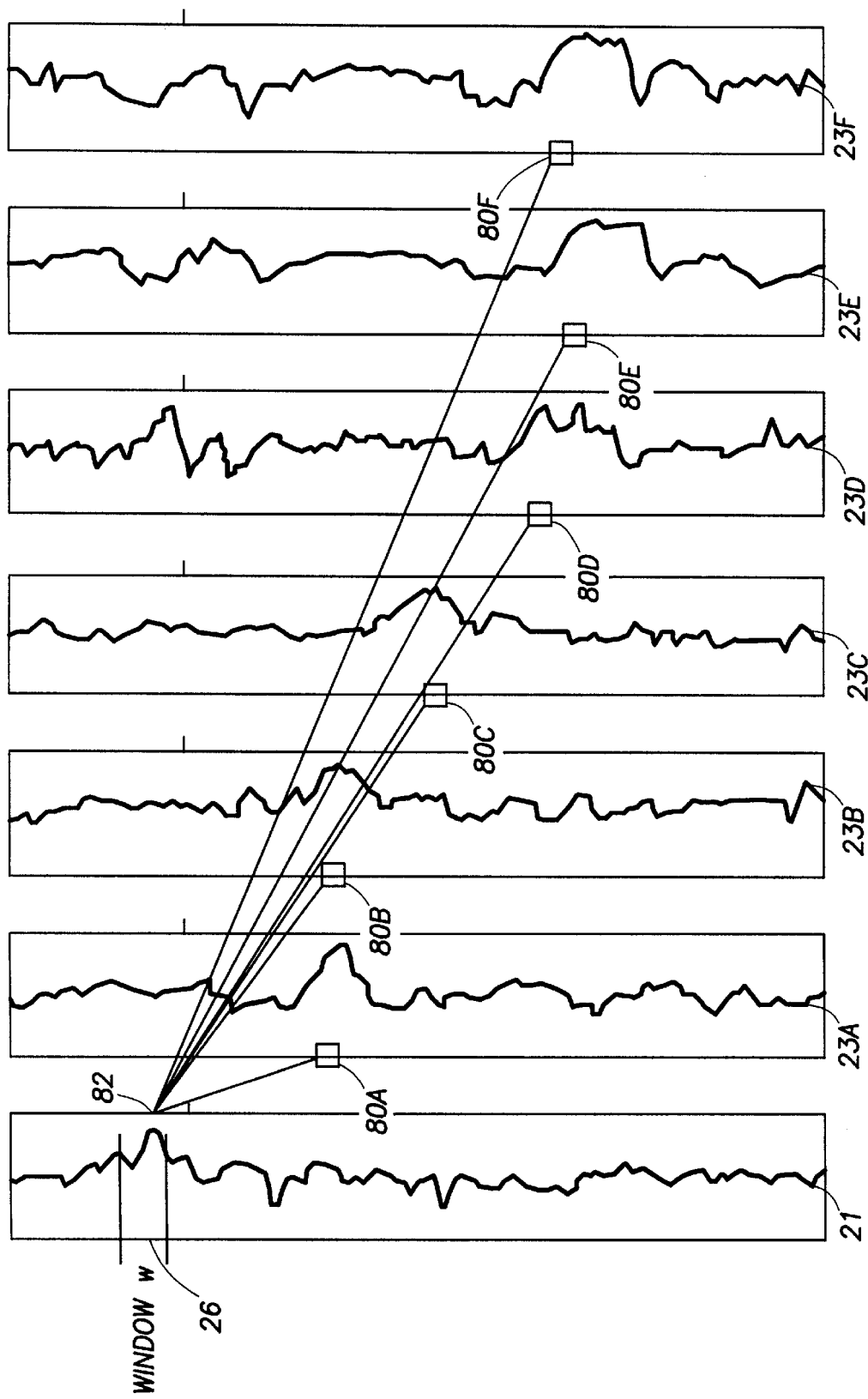
FIG. 17 shows the effects of the reference log curve parameter size of FIG. 15 being carefully selected in accordance with an embodiment of the invention.

There are variables that affect the maximum value of the AMCA function 30. These variables may include reference window length w, target window length Wy, and criteria for shape and size matching in addition to the covariance. The user can control the sensitivity of the AMCA function 30 to the covariance, shape, and size by controlling the $\alpha$, $\beta$, $\gamma$ parameters. The length w controls how much of the event on the reference curve is used to compare with the target. If w for window 26 is too small compared to the event width on the reference log curve, the event of interest will not be found (i.e., a good correlation cannot be found and a mispick will occur, for example, no marker or an incorrect marker will be identified on the target curve), as schematically shown in FIG. 15. An incorrect marker (e.g., marker 81 in FIG. 15) may be recognized by an experienced geoscientist in many cases. Similarly, if the length w of window 26 is too large, the event of interest will also not be found (e.g., there will be a mis-pick), as schematically shown in FIG. 16, because the value of the correlation maximum becomes less distinct relative to the background values of the AMCA function 30. Moreover, if the reference event has mainly low frequency components, the covariance function 30 calculation may work better with larger values of w; for mainly high frequency components, smaller values of w may be more appropriate. FIG. 17 shows an example of a window 26 whose length w has been carefully selected for the event of interest contained within it. FIG. 17 shows reference log curve 21, target log curves 23A–F (each similar to target curve 23 in FIG. 3) from different wells, and markers 82 (user picked) and 80A–F (found in accordance with an embodiment of the invention, e.g., the semi-automatic method). In FIG. 17, none of the markers 80A–F are mis-picked unlike in FIGS. 15 and 16.

Figure 19:
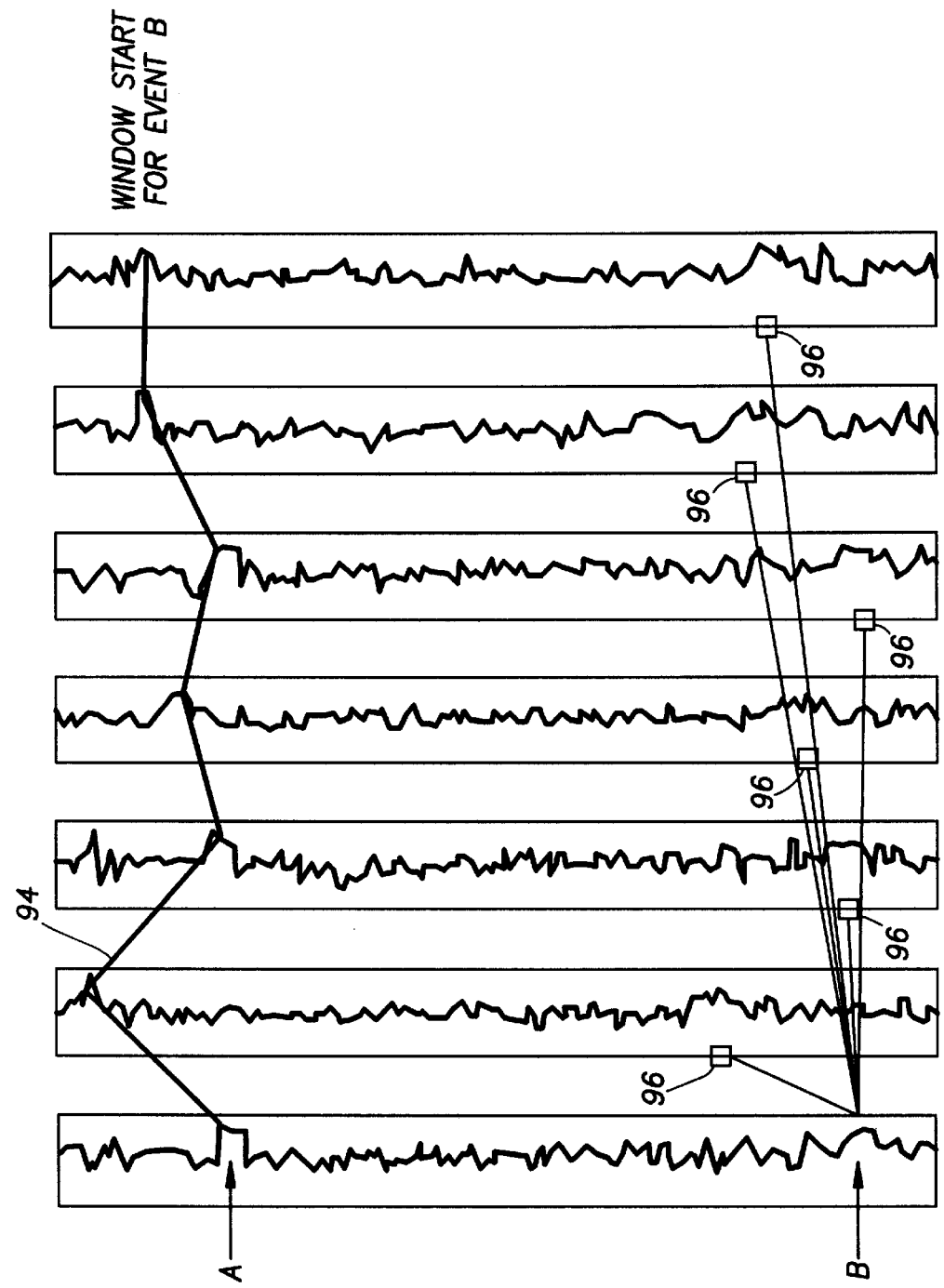
FIG. 19 shows the result of the application of the method of FIG. 18 in accordance with an embodiment of the invention.
Figure 20:
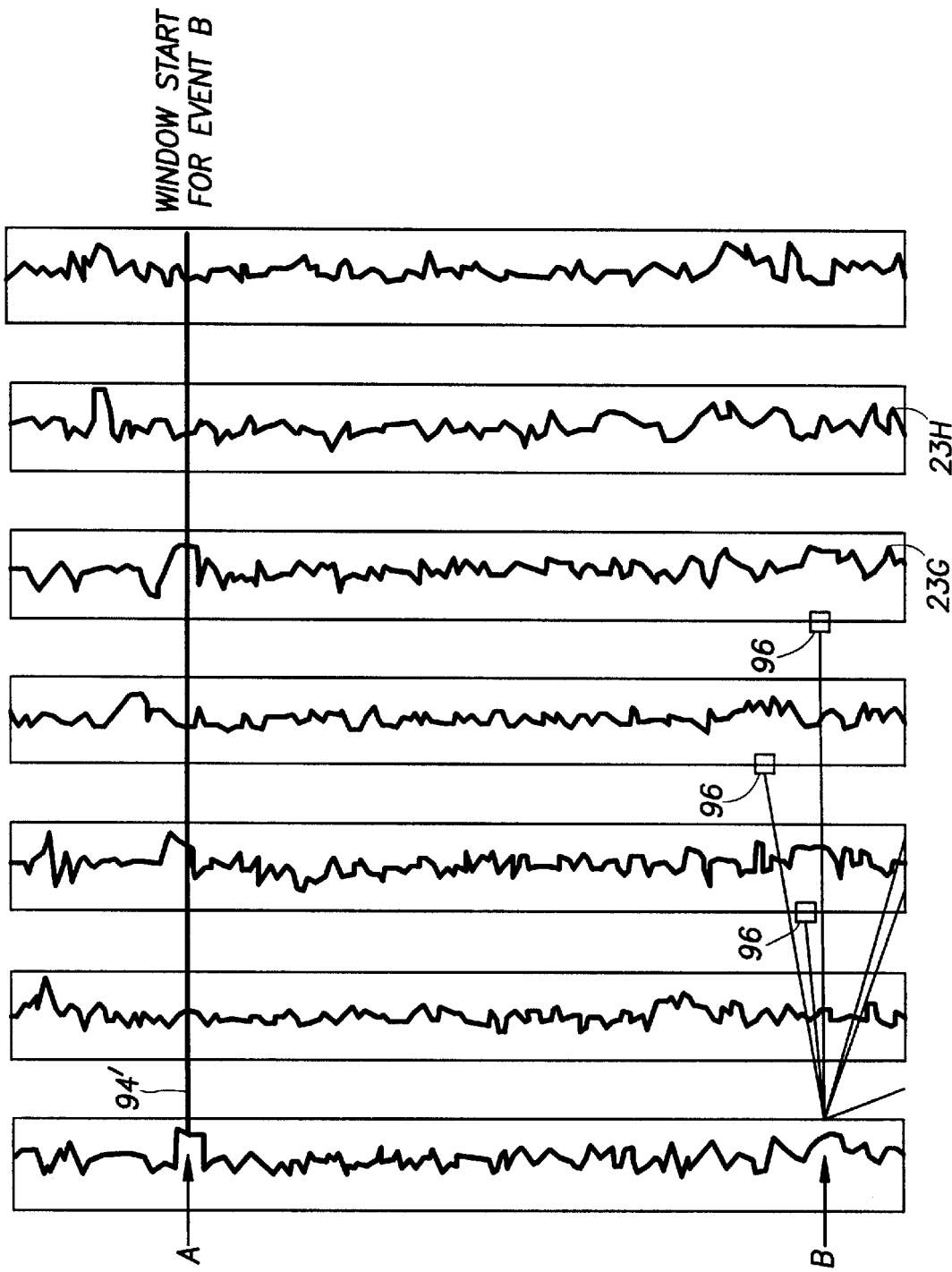
FIG. 20 shows the result of the application of another method in accordance with an embodiment of the invention.

In accordance with an embodiment of the invention, as shown in FIG. 18, an event A has been previously picked and the markers saved (whether from the automatic method or semi-automatic method described above). It is now available to the used as a guide horizon 94 (similar to guide horizon 50A). The start 92B of the windows (similar to window 28) for picking event B is then driven by using the depth of guide horizon A 94 and the selected geologic rule. For this example, the onlap rule is applied so that the window (Wy) for each target curve will be parallel to guide horizon A 94. This may be accomplished by setting the center 95 (not shown on all target log curves) of window (Wy) at the same depth below guide horizon A 94 on the target logs as the center 93 of window w is on the reference log. A higher weight may be applied to the size term (the term multiplied by $\gamma$) of the AMCA function 30 by increasing the $\gamma$ value. This will produce a greater correlation (AMCA function 30) maximum (not shown) when the amplitudes of samples between the reference log and target log are most similar (as before, $\alpha+\beta+\gamma=1.0$). The new picks for event B are shown in FIG. 19. On the other hand, in FIG. 20, results from a constant start position (not shown) of the search windows (Wy) are shown. Here, the horizon A 94' (similar to guide horizon 50A) is flat. From FIGS. 19 and 20, it is evident that the Wy start position has an effect on the correlation (AMCA function 30) maxima locations which correspond to markers 96 (similar to markers 80A–F in FIG. 17 and 94b–g in FIG. 18) on the target curves. Some markers do not even appear (i.e., there may be mis-picks) in the target log data in target curves 23G and 23H (both similar to target curve 23) in FIG. 20.

The AMCA function 30 maxima may also be affected by shape and size matching which may be used to weight similarity in shape and size of events on the reference and target log curves. If criteria for shape and size matching are to be used, they may be applied by changing the values of the $\alpha$, $\beta$,$\gamma$ parameters of the Cmax($\tau$) 30 calculation. The weight that affects shape is the $\beta$ term, and a high weight here will produce a greater correlation (AMCA function 30) maximum when the reference and target logs have a similar scatter of values (standard deviations).

Besides a fixed reference log curve (e.g., log curve X 21 of FIG. 3), in accordance with the semi-automatic embodiment of the invention, however, a method has been developed in which the reference log curve may change ("roll") from the initial user-selected borehole to the borehole log curve that immediately precedes the current target borehole log curve being evaluated. This may be advantageous in geologic environments that systematically change in some direction (e.g., a formation continuously thickens in a northern direction). The user can select multiple target wells in such an order that the formation tops (recorded as events on the log curves) of interest will be seen to change gradually from the initial reference log to the final target log through the intermediate target logs, where a direct comparison of the original reference and final target logs would be quite different. Referring to FIGS. 10 and 12, the back-correlation and loop-tying that was described are examples of the rolling method. Table 1 shows example results obtained for the maximum covariance (AMCA function 30) for the fixed and rolling references, as well as picked depths.

TABLE 1

| Borehole | Fixed Reference Maximum Covariance | Fixed Reference Picked Depth | Rolling Reference Maximum Covariance | Rolling Reference Picked Depth |
|---|---|---|---|---|
| 2 | 0.994385 | 5855 | 0.994385 | 5855 |
| 3 | 0.998366 | 5853 | 0.993058 | 5855 |
| 4 | 0.995838 | 5835 | 0.996672 | 5802 |
| 5 | 0.996072 | 5854 | 0.999435 | 5747 |
| 6 | 0.993388 | 5820 | 0.999432 | 5725 |
| 7 | 0.995725 | 5819 | 0.998902 | 5760 |

From Table 1, it appears that the rolling reference method produced better correlations than the fixed reference approach for this example. The user guide (semi-automatic) method described above may use either the fixed reference or the rolling reference log options.

Other embodiments are within the scope of the following claims.

What is claimed is:

1. A method of interpreting reference and target well log curves recorded from different wells to help determine the approximate depth of related features at the well locations, the method comprising:

preprocessing the reference and target well log curves according to user input parameters;

applying a guide function to the curves which limits the interpretation to portions of the curves;

computing a correspondence indication between the portions, said correspondence indication being a function of at least one of a ratio of standard deviation and a ratio of summed amplitude; and evaluating the correspondence indication to determine if events on the portions are related.

2. The method of claim 1, wherein the preprocessing comprises applying a filter to the well log curve data.

3. The method of claim 1, wherein the preprocessing comprises accounting for complex geology.

4. The method of claim 1, wherein the preprocessing comprises setting process order.

5. The method of claim 4, wherein setting process order comprises setting process order for loop-tying.

6. The method of claim 4, wherein setting process order comprises setting process order for back-correlation.

7. The method of claim 4, wherein setting process order comprises setting process order for a rolling schema.

8. The method of claim 4, wherein setting the process order comprises setting the process order for a fixed schema.

9. The method of claim 1, wherein the applying comprises setting an automatic option.

10. The method of claim 1, wherein the applying comprises setting a semi-automatic option.

11. The method of claim 1, further comprising calculating a target window for the target data.

12. The method of claim 11, further comprising setting a start for the target window relative to the guide function and a sequence rule.

13. The method of claim 11, further comprising setting a start for the target window relative to a user pick on the target data.

14. The method of claim 1, further comprising applying a conformable sequence rule to the reference data, wherein one of a proportional stretch and squeeze is applied.

15. The method of claim 1, further comprising inverting the reference data.

16. The method of claim 1, further comprising applying weights to the portions of the reference and target data.

17. The method of claim 1, wherein the computing comprises computing a covariance function.

18. The method of claim 1, wherein the computing comprises computing standard deviations of the reference and target data in the portions.

19. The method of claim 1, wherein computing comprises computing amplitude sums of the reference and target data in the portions.

20. The method of claim 1, wherein computing the correspondence indication comprises summing weighted covariance, standard deviation, and amplitude sum terms of the reference and target data in the portions.

21. The method of claim 1, further comprising finding a maximum of the correspondence indication.

22. The method of claim 21, further comprising converting the maximum to an approximate absolute depth on the target log curve.

23. The method of claim 22, further comprising one of creating a marker and updating a marker at the approximate absolute depth.

24. The method of claim 1, further comprising displaying the reference and target data on a display.

25. An apparatus for interpreting reference and target well log curves recorded from different wells to help determine the approximate depth of related features at the well locations, the apparatus comprising:

a memory which stores instructions for interpreting the well log data; and a processor coupled to the memory which is instructed by the instructions to:

preprocess the reference and target well log data according to user input parameters, apply a guide function to the preprocessed well log data which limits the interpretation to portions of the data, compute a correspondence indication between the portions, said correspondence indication being a function of at least one of a ratio of standard deviation and a ratio of summed amplitude, and evaluate the correspondence indication to determine if events on the portions are related.

26. The apparatus of claim 25, wherein the memory comprises volatile and nonvolatile memory.

27. The apparatus of claim 25, wherein the memory comprises a CD-ROM.

28. The apparatus of claim 25, wherein the memory comprises instructions for an automatic option and a semi-automatic option.

29. The apparatus of claim 25, wherein the correspondence indication is stored in the memory.

30. The apparatus of claim 25, further comprising an output record medium coupled to the processor and memory which displays the target and reference data.

31. The apparatus of claim 25, wherein the output record medium comprises a computer monitor.

32. The apparatus of claim 25, further input/output (I/O) devices coupled to the processor and memory which communicate the reference and target data.

33. A system for analyzing well log curve data recorded from geographically distributed wells to determine the location of related formation tops in the wells, comprising:

input/output (I/O) devices which receive well log data recorded from wells; and a processor coupled to the input/output (I/O) devices which is instructed to:

preprocess the well log data according to user input parameters, determine whether a guide function is to be applied to the data, make a determination of whether events in the data are correlated, based in part on the user input parameters, by computing a correspondence indication, said correspondence indication being a function of at least one of a ratio of standard deviation and a ratio of summed amplitude, and if the events are related, convert a location associated with the correlation to an approximate location of the formation tops in the wells.

34. The system of claim 33, wherein the processor is instructed to make the determination of whether events are correlated using a cutoff parameter supplied by a user.

35. A method of evaluating the correspondence between events on a reference and a target well log curve recorded in reference and target wells to identify an approximate location of related layers in the wells, comprising:

determining whether a correspondence indicator between the events on the reference and target well log curves has a value greater than a cutoff parameter, said correspondence indicator being a function of at least one of a ratio of standard deviation and a ratio of summed amplitude;

applying a prescribed geologic guide to determine the location of an extremum of the correspondence indicator on the target well log curve; and converting the location of the extremum to an approximate absolute location within the target well.

36. The method of claim 35, wherein the determining comprises determining whether a sum of covariance, standard deviation, and amplitude sum terms has a value greater than the cutoff parameter.

37. The method of claim 35, wherein the applying comprises applying a prescribed geologic guide to determine the location of a maximum of the correspondence indicator.

38. A computer program, residing on a computer-readable medium, comprising instructions for causing a computer to:

preprocess reference and target well log data according to user input parameters;

apply a guide function to the well log data which directs processing of the well log data;

compute a correspondence indication between portions of the well log data, said correspondence indication being a function of at least one of a ratio of standard deviation and a ratio of summed amplitude; and evaluate the correspondence indication to determine whether the portions are related.

39. A method of interpreting reference and target well log curves recorded from different wells to help determine the approximate depth of related features at the well locations, comprising the steps of:

(a) computing a correspondence indication between reference and target well log curves, said correspondence indication being a function of at least one of a ratio of standard deviation and a ratio of summed amplitude; and (b) evaluating the correspondence indication to determine if events on the reference and target well log curves are related.

40. The method of claim 39, wherein the computing step (a) comprises the steps of:

(a1) preprocessing the reference and target well log curves according to user input parameters; and (a2) computing said correspondence indication between reference and target well log curves, said correspondence indication being a function of at least one of said ratio of standard deviation and said ratio of summed amplitude.

41. The method of claim 39, wherein the computing step (a) comprises the steps of:

(a1) selecting a reference point on a reference well log curve;

(a2) locating a slidable window (w) associated with said reference point on said reference well log curve;

(a3) locating a window (Wy) associated with a target well log curve, said window (Wy) corresponding to said slidable window (w) associated with the reference well log curve;

(a4) sliding said window (w) associated with said reference well log curve relative to said window (Wy) associated with said target well log curve; and (a5) computing said correspondence indication during the sliding step (a4), said correspondence indication being a function of at least one of said ratio of standard deviation and said ratio of summed amplitude.

42. The method of claim 41, wherein the locating step (a3) of locating a window (Wy) associated with a target well log curve comprises the steps of:

(a31) applying a guide function to the reference and the target well log curves which limits the interpretation to portions of the reference and target well log curves; and (a32) executing a sequence rule, said window (Wy) being located associated with said target well log curve when the executing step (a32) is complete.

43. The method of claim 42, wherein said sequence rule comprise an on lap sequence.

44. The method of claim 42, wherein said sequence rule comprise a truncated sequence.

45. The method of claim 42, wherein said sequence rule comprise a conformable sequence.

46. The method of claim 42, wherein said sequence rule comprise an unstructured sequence.

47. The method of claim 41, wherein the locating step (a3) of locating a window (Wy) associated with a target well log curve comprises the steps of:

(a31) manually selecting a point on said target well log curve, said window (Wy) being located associated with said target well log curve when the manual selecting step (a31) is complete.

48. The method of claim 41, wherein said correspondence indication computed during the computing step (a5) is expressed by the following mathematical relation:

$$Cmax(\tau) = \alpha C_\tau + \beta \left(\frac{\alpha_a}{\alpha_b}\right) + \gamma \left(\frac{\sum a}{\sum b}\right)$$

where:

$\alpha C_\tau$ is a weighted combination of covariance, $$\beta\left(\frac{\alpha_a}{\alpha_b}\right)$$

is said ratio of standard deviation, $$\gamma\left(\frac{\sum a}{\sum b}\right)$$

is said ratio of summed amplitude, and

Cmax (τ) is said correspondence indication.

49. The method of claim 41, wherein said correspondence indication computed during the computing step (a5) comprises a curve having at least one peak, an amplitude of said at least one peak exceeding a cutoff.

50. The method of claim 49, wherein the evaluating step (b) for evaluating the correspondence indication to determine if events on the reference and target well log curves are related comprises the steps of:
 (b1) determining a time τ on said correspondence indication extending from said at least one peak on said curve of said correspondence indication to an origin of said curve of said correspondence indication;
 (b2) locating a first point on said target well log curve which corresponds directly to said reference point on said reference well log curve; and
 (b3) locating a second point on said target well log curve, said second point being displaced by said time τ from said first point on said target well log curve,
 said reference point on said reference well log curve being a first event,
 said second point on said target well log curve being a second event,
 said first event being related to said second event.

51. The method of claim 41, wherein said correspondence indication computed during the computing step (a5) comprises a curve having at least two peaks, an amplitude of each of said at least two peaks exceeding said cutoff.

52. The method of claim 51, wherein the evaluating step (b) for evaluating the correspondence indication to determine if events on the reference and target well log curves are related comprises the steps of:
 (b1) selecting one of said at least two peaks on said curve of correspondence indication;
 (b2) determining a time τ on said correspondence indication extending from said one of said at least two peaks on said curve of said correspondence indication to an origin of said curve of said correspondence indication;
 (b3) locating a first point on said target well log curve which corresponds directly to said reference point on said reference well log curve; and
 (b4) locating a second point on said target well log curve, said second point being displaced by said time τ from said first point on said target well log curve,
 said reference point on said reference well log curve being a first event,
 said second point on said target well log curve being a second event,
 said first event being related to said second event.

53. The method of claim 52, wherein the selecting step (b1) for selecting one of said at least two peaks on said curve of correspondence indication comprises the steps of:
 (b11) executing a sequence rule or a user guide function;
 (b12) identifying said one of said at least two peaks on said curve of said correspondence indication in response to the executing step (b11); and
 (b13) selecting said one of said at least two peaks in response to the identifying step (b12).

54. An apparatus adapted for interpreting reference and target well log curves recorded from different wells to help determine the approximate depth of related features at the well locations, comprising:
 a memory adapted for storing instructions, said instructions being used to interpret the reference and target well log data; and
 a processor coupled to the memory,
 said processor being instructed by said instructions stored in said memory to perform a plurality of functions, said plurality of functions including:
  (a) computing a correspondence indication between reference and target well log curves, said correspondence indication being a function of at least one of a ratio of standard deviation and a ratio of summed amplitude; and
  (b) evaluating the correspondence indication to determine if events on the reference and target well log curves are related.

55. The apparatus of claim 54, wherein the computing function (a) performed by the processor in response to said instructions comprises:
 (a1) preprocessing the reference and target well log curves according to user input parameters; and
 (a2) computing said correspondence indication between reference and target well log curves, said correspondence indication being a function of at least one of said ratio of standard deviation and said ratio of summed amplitude.

56. The apparatus of claim 54, wherein the computing function (a) performed by the processor in response to said instructions comprises:
 (a1) selecting a reference point on a reference well log curve;
 (a2) locating a slidable window (w) associated with said reference point on said reference well log curve;
 (a3) locating a window (Wy) associated with a target well log curve, said window (Wy) corresponding to said slidable window (w) associated with the reference well log curve;
 (a4) sliding said window (w) associated with said reference well log curve relative to said window (Wy) associated with said target well log curve; and
 (a5) computing said correspondence indication during the sliding step (a4), said correspondence indication being a function of at least one of said ratio of standard deviation and said ratio of summed amplitude.

57. The apparatus of claim 56, wherein the locating function (a3), of locating a window (Wy) associated with a target well log curve, performed by the processor in response to said instructions comprises:
 (a31) applying a guide function to the reference and the target well log curves which limits the interpretation to portions of the reference and target well log curves; and
 (a32) executing a sequence rule, said window (Wy) being located associated with said target well log curve when the executing step (a32) is complete.

58. The apparatus of claim 57, wherein said sequence rule comprises an on lap sequence.

59. The apparatus of claim 57, wherein said sequence rule comprises a truncated sequence.

60. The apparatus of claim 57, wherein said sequence rule comprises a conformable sequence.

61. The apparatus of claim 57, wherein said sequence rule comprises an unstructured sequence.

62. The apparatus of claim 56, wherein the locating function (a3), of locating a window (Wy) associated with a target well log curve, performed by the processor in response to said instructions comprises:

(a31) manually selecting a point on said target well log curve, said window (Wy) being located associated with said target well log curve when the manual selecting step (a31) is complete.

63. The apparatus of claim 56, wherein said correspondence indication computed during the computing function (a5) is expressed by the following mathematical relation:

$$Cmax(\tau) = \alpha C_\tau + \beta\left(\frac{\alpha_a}{\alpha_b}\right) + \gamma\left(\frac{\sum a}{\sum b}\right)$$

where:

$\alpha C_\tau$ is a weighted combination of covariance, $$\beta\left(\frac{\alpha_a}{\alpha_b}\right)$$

is said ratio of standard deviation, $$\gamma\left(\frac{\sum a}{\sum b}\right)$$

is said ratio of summed amplitude, and

Cmax ($\tau$) is said correspondence indication.

64. The apparatus of claim 56, wherein said correspondence indication computed during the computing function (a5) comprises a curve having at least one peak, an amplitude of said at least one peak exceeding a cutoff.

65. The apparatus of claim 64, wherein the evaluating function (b), for evaluating the correspondence indication to determine if events on the reference and target well log curves are related, performed by the processor in response to said instructions comprises:

(b1) determining a time $\tau$ on said correspondence indication extending from said at least one peak on said curve of said correspondence indication to an origin of said curve of said correspondence indication;

(b2) locating a first point on said target well log curve which corresponds directly to said reference point on said reference well log curve; and (b3) locating a second point on said target well log curve, said second point being displaced by said time $\tau$ from said first point on said target well log curve, said reference point on said reference well log curve being a first event, said second point on said target well log curve being a second event, said first event being related to said second event.

66. The apparatus of claim 56, wherein said correspondence indication computed during the computing function (a5) comprises a curve having at least two peaks, an amplitude of each of said at least two peaks exceeding a cutoff.

67. The apparatus of claim 66, wherein the evaluating function (b), for evaluating the correspondence indication to determine if events on the reference and target well log curves are related, performed by the processor in response to said instructions comprises:

(b1) selecting one of said at least two peaks on said curve of correspondence indication;

(b2) determining a time $\tau$ on said correspondence indication extending from said one of said at least two peaks on said curve of said correspondence indication to an origin of said curve of said correspondence indication;

(b3) locating a first point on said target well log curve which corresponds directly to said reference point on said reference well log curve; and (b4) locating a second point on said target well log curve, said second point being displaced by said time $\tau$ from said first point on said target well log curve, said reference point on said reference well log curve being a first event, said second point on said target well log curve being a second event, said first event being related to said second event.

68. The apparatus of claim 67, wherein the selecting function (b1), for selecting one of said at least two peaks on said curve of correspondence indication, performed by the processor in response to said instructions comprises:

(b11) executing a sequence rule or a user guide function;

(b12) identifying said one of said at least two peaks on said curve of said correspondence indication in response to the executing function (b11); and (b13) selecting said one of said at least two peaks in response to the identifying function (b12).

* * * * *